(12) United States Patent
Hanaoka et al.

(10) Patent No.: US 8,593,594 B2
(45) Date of Patent: Nov. 26, 2013

(54) LIQUID CRYSTAL DISPLAY DEVICE

(71) Applicant: Sharp Kabushiki Kaisha, Osaka (JP)

(72) Inventors: Kazutaka Hanaoka, Kanagawa (JP); Katsufumi Ohmuro, Kanagawa (JP); Kunihiro Tashiro, Mie (JP); Jin Hirosawa, Kanagawa (JP); Norio Sugiura, Kanagawa (JP); Kengo Kanii, Kanagawa (JP); Shota Makimoto, Kanagawa (JP); Yasuhiro Ohno, Tottori (JP); Isao Tsushima, Tottori (JP); Tomonori Tanose, Tottori (JP); Takashi Takagi, Kanagawa (JP); Tetsuya Fujikawa, Tottori (JP); Takahiro Sasaki, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/796,092

(22) Filed: Mar. 12, 2013

(65) Prior Publication Data

US 2013/0235293 A1 Sep. 12, 2013

Related U.S. Application Data

(60) Continuation of application No. 13/152,473, filed on Jun. 3, 2011, now Pat. No. 8,405,802, which is a division of application No. 12/691,230, filed on Jan. 21, 2010, now Pat. No. 7,982,829, which is a continuation of application No. 11/441,342, filed on May 26, 2006, now Pat. No. 7,656,474.

(30) Foreign Application Priority Data

May 30, 2005 (JP) .................................. 2005-158094

(51) Int. Cl.
G02F 1/1335 (2006.01)

(52) U.S. Cl.
USPC .......................................................... 349/100

(58) Field of Classification Search
None
See application file for complete search history.

(56) References Cited

U.S. PATENT DOCUMENTS

| | | | |
|---|---|---|---|
| 6,778,229 | B2 | 8/2004 | Inoue et al. |
| 7,656,474 | B2 | 2/2010 | Hanaoka et al. |
| 2003/0043326 | A1 | 3/2003 | Sawasaki et al. |
| 2003/0043336 | A1 | 3/2003 | Sasaki et al. |
| 2003/0067579 | A1 | 4/2003 | Inoue et al. |

(Continued)

FOREIGN PATENT DOCUMENTS

| | | |
|---|---|---|
| JP | 2003-84266 A | 3/2003 |
| JP | 2003-149647 | 5/2003 |

(Continued)

*Primary Examiner* — Sung Pak
(74) *Attorney, Agent, or Firm* — Nixon & Vanderhye P.C.

(57) ABSTRACT

The technology presented herein has a feature of providing a liquid crystal display device of an excellent viewing angle characteristic and high brightness, including: liquid crystals containing polymerizable monomers between a first substrate with a pixel electrode having micro slits and a second substrate facing the first substrate; wherein the monomers are polymerizable with voltage applied to the liquid crystals; and an alignment orientation of the liquid crystals is controllable to a direction of extending the micro slit, wherein the pixel electrode includes: a direct coupling part electrically connected to a switching element; a capacitive coupling part electrically insulated from the switching element, and a space between the direct and capacitive coupling parts, wherein directions in which the micro slits are extended along the direct and capacitive coupling parts are orthogonal to each other.

8 Claims, 34 Drawing Sheets

(56) References Cited

U.S. PATENT DOCUMENTS

| | | |
|---|---|---|
| 2003/0095229 A1 | 5/2003 | Inoue et al. |
| 2003/0193625 A1* | 10/2003 | Yoshida et al. ............ 349/43 |
| 2005/0030458 A1 | 2/2005 | Sasabayashi et al. |
| 2006/0209221 A1 | 9/2006 | Taguchi |
| 2006/0268186 A1 | 11/2006 | Kamada et al. |
| 2007/0008444 A1 | 1/2007 | Nakanishi et al. |
| 2007/0019120 A1 | 1/2007 | Tasaka et al. |

FOREIGN PATENT DOCUMENTS

| | | |
|---|---|---|
| JP | 2003-177408 | 6/2003 |
| JP | 2004-4460 A | 1/2004 |
| JP | 2004-279904 A | 10/2004 |

* cited by examiner

SLIT AZIMUTH ANGLE 180 DEG

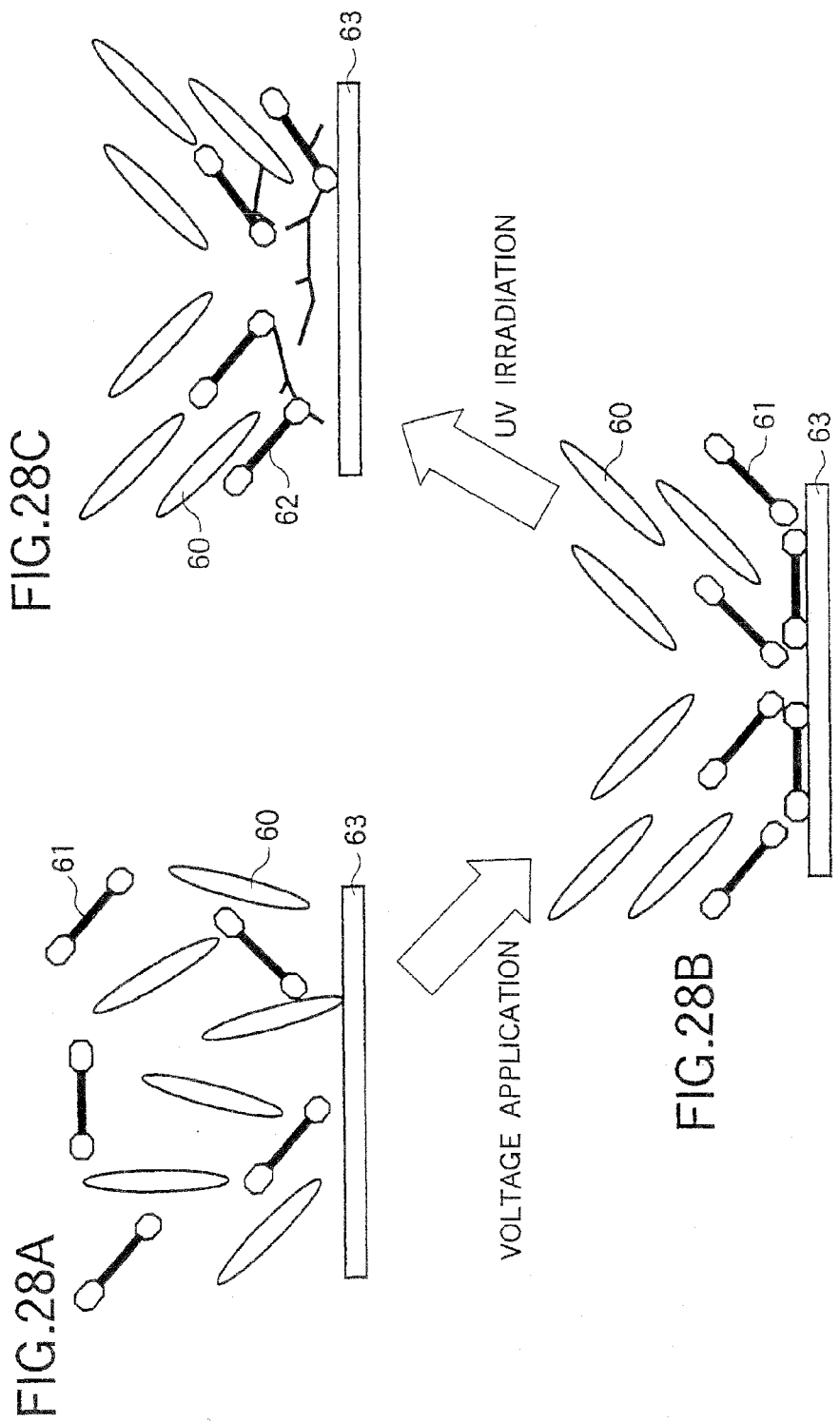

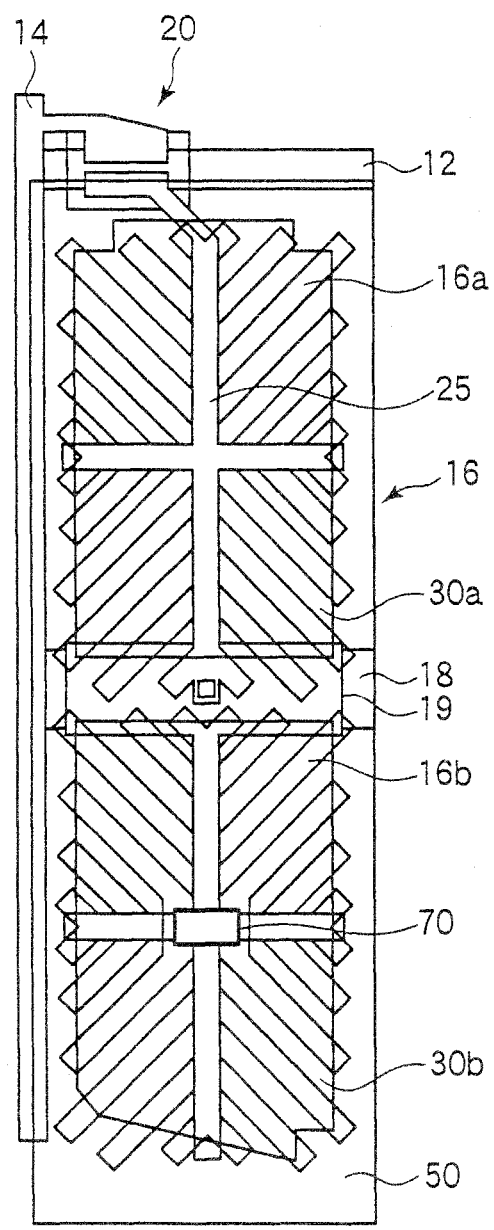

LIQUID CRYSTAL DISPLAY DEVICE

CROSS-REFERENCE TO RELATED APPLICATIONS

This application is a continuation of U.S. application Ser. No. 13/152,473, filed Jun. 3, 2011, now allowed, which is a divisional of U.S. application Ser. No. 12/691,230, filed Jan. 21, 2010, now U.S. Pat. No. 7,982,829, which is a continuation of U.S. application Ser. No. 11/441,342, filed May 26, 2006, now U.S. Pat. No. 7,656,474, which claims priority to Japanese Application 2005-158094, filed May 30, 2005, the entire contents of each application is incorporated herein by reference.

BACKGROUND OF THE INVENTION

1. Field of the Invention

The present invention relates to a liquid crystal display device for use in a display unit of electronic appliances.

2. Description of the Related Art

For a liquid crystal display device which can attain a wide viewing angle, a liquid crystal display device in MVA (Multi-domain Vertical Alignment) mode is known. The liquid crystal display device in the MVA mode has liquid crystals of negative dielectric anisotropy which are sealed between a pair of substrates, a vertical alignment film which aligns liquid crystal molecules almost vertically with respect to the substrate surface, and an alignment regulating structure which regulates the alignment orientation of liquid crystal molecules. For the alignment regulating structure, a linear protrusion formed of a dielectric and an open part (main slit) of an electrode are used. When voltage is applied, the liquid crystal molecules are tilted in the direction vertical to the direction in which the alignment regulating structure is extended. The alignment regulating structure is used to provide a plurality of areas in a single pixel, the area being different in the alignment orientation of the liquid crystal molecules, and thus a wide viewing angle can be obtained. However, in this liquid crystal display device, since the protrusion and the main slit are formed in the pixel area, the aperture ratio is lower than ones in the TN (Twisted Nematic) mode etc., and thus the light transmittance is reduced.

FIG. 34 shows the pixel structure of a liquid crystal display device in the MVA mode in which the aperture ratio is improved. FIG. 35 shows the sectional structure of the liquid crystal display device sectioned at line A-A shown in FIG. 34. As shown in FIGS. 34 and 35, the liquid crystal display device has a pair of substrates 102 and 104, and liquid crystals 106 which are sealed between the substrates 102 and 104. On the substrate 102, a gate bus line 112 and a drain bus line 114 are formed as they intersect with each other through an insulating film. A pixel area is defined by the gate bus line 112 and the drain bus line 114. Near the position at which the gate bus line 112 and the drain bus line 114 intersect with each other, a TFT 120 is formed. In each of the pixel areas, a pixel electrode 116 is formed. The pixel electrode 116 is formed with a micro slit 116d which is cut from a rim. The alignment orientation of the liquid crystals molecules 108 is controlled by an oblique electric field at the end of the pixel electrode 116. In this liquid crystal display device, a high aperture ratio and light transmittance can be obtained because the linear protrusion and the main slit are not formed in the pixel area. However, since the micro slit 116d has weaker alignment control than that of the linear protrusion and the main slit, the liquid crystal display device has a long response time of the liquid crystals, and the alignment is easily disturbed by a finger press or so.

Then, a polymer sustained alignment (PSA) technique is introduced in which polymerizable monomers are mixed in liquid crystals to polymerize the monomers in the state in which voltage is applied to the liquid crystals and thus the orientation in which the liquid crystals are tilted is stored (for example, see Patent Document 1). In the liquid crystal display device using the PSA technique, a polymerized film which stores the alignment orientation of the liquid crystals is formed on the interface of an alignment film. Thus, strong alignment control is obtained, and it can be ensured that liquid crystals molecules 108 are tilted in the direction in parallel with the micro slit 116d.

However, in a liquid crystal display device in the VA mode in which the birefringence property of the liquid crystals vertically aligned is used for switching light, the phase difference caused by birefringence in the oblique direction is greatly shifted from that in the front direction, and thus display can have a white patch when a screen is viewed from the oblique direction. This is a phenomenon called washout in which the gray level brightness characteristic, that is, the γ characteristic is shifted from a set value in all the gray scale levels more or less.

For a scheme to improve washout, there is a technique in which a single pixel is split into a plurality of areas to vary the voltage applied to liquid crystals in a single pixel. This is a technique in which the alignment orientation of liquid crystals is varied in the azimuth angle direction as well as in the polar angle direction to reduce the shift of the phase difference between the oblique direction and the front direction. More specifically, the alignment orientation of liquid crystals in a single pixel is split in the polar angle direction as well as in the azimuth angle direction to average the variation in the phase difference in the polar angle direction as well, and thus a white patch can be reduced.

FIG. 36 shows the pixel structure of a liquid crystal display device which implements the technique above. As shown in FIG. 36, a pixel electrode in each of pixel areas has a direct coupling part 116a which is directly connected to a source electrode of a TFT 120, a capacitive coupling part 116b which is indirectly connected to the source electrode through capacitance formed between it and a control capacitance electrode 125, and a space 117 which isolates them. The direct coupling part 116a and the capacitive coupling part 116b each have a plurality of line electrodes (width l) which is extended in a predetermined direction, and a micro slit (width s) which is between the adjacent line electrodes. Near the space 117, the micro slits of the direct coupling part 116a and the micro slit of the capacitive coupling part 116b are extended almost in parallel with each other. In the configuration shown in FIG. 36, the voltage applied to the liquid crystals are varied between the direct coupling part 116a and the capacitive coupling part 116b to obtain an effect to reduce a white patch.

However, this mode has a problem that a potential difference is generated between the direct coupling part 116a and the capacitive coupling part 116b and that potential difference causes a shift of the alignment orientation of liquid crystals in the space 117 from the orientation defined by the micro slit of the pixel electrode. FIG. 37A shows the pixel electrode structure near the space 117. FIG. 37B shows the simulation result of the display state of a pixel. As shown in FIG. 37A, since a smaller voltage is applied to the capacitive coupling part 116b when it is driven than that to the direct coupling part 116a, the electrode end of the direct coupling part 116a works just like a main slit, and the tilt orientation of the liquid crystal molecules is temporarily vertical to the electrode end of the direct coupling part 116a. On this account, the alignment at the direct coupling part 116a and the capacitive coupling part 116b near the space 117 is greatly disturbed. This phenomenon is called azimuth angle (φ) fluctuations. When the φ fluctuations occur, the birefringence properties of the liquid crystals are locally reduced to generate a dark line as shown in FIG. 37B. Thus, the light transmittance of a pixel is decreased. In addition, the shift of the alignment orientation of liquid crystals also affects the viewing angle characteristic to reduce the effect that improves the white patch described above as well. In order to reduce the influence on the viewing angle characteristic, it is necessary to shield light in the space 117 between the direct coupling part 116a and the capacitive coupling part 116b by a black matrix (BM). On this account, a problem arises that the light transmittance of a pixel is further decreased.

Patent Document 1: JP-A-2003-149647
Patent Document 2: JP-A-2003-177408

SUMMARY OF THE INVENTION

An object of the invention is to provide a liquid crystal display device which can attain an excellent viewing angle characteristic and high brightness.

The object is achieved by a liquid crystal display device including: sandwiching liquid crystals containing polymerizable monomers between a first substrate provided with a pixel electrode having a micro slit and a second substrate facing the first substrate; polymerizing the monomers as voltage is applied to the liquid crystals; and controlling an alignment orientation of the liquid crystals to a direction in which the micro slit is extended, wherein the pixel electrode includes: a direct coupling part which is electrically connected to a switching element; a capacitive coupling part which is electrically insulated from the switching element, and which forms capacitance with a control capacitance electrode which has a same potential as that of a source electrode of the switching element; and a space which is between the direct coupling part and the capacitive coupling part, wherein directions in which the micro slit is extended in the adjacent direct coupling part and in the capacitive coupling part are orthogonal to each other.

In the liquid crystal display device according to the invention, the space is in a linear form.

In the liquid crystal display device according to the invention, a longitudinal direction of the space is almost in parallel with a direction in which the micro slit is extended in the capacitive coupling part.

In the liquid crystal display device according to the invention, a width of the space is almost the same as a width of the micro slit.

In the liquid crystal display device according to the invention, the direct coupling part and the capacitive coupling part each have four split areas in which the micro slit is extended in directions different from each other, and the control capacitance electrode and the storage capacitor electrode are disposed along a border between the split areas.

In the liquid crystal display device according to the invention, the liquid crystals have negative dielectric anisotropy, and are vertically aligned when voltage is not applied.

According to the invention, a liquid crystal display device can be implemented which can obtain an excellent viewing angle characteristic and high brightness.

BRIEF DESCRIPTION OF THE DRAWINGS

The teachings of the invention can be readily understood by considering the following detailed description in conjunction with the accompanying drawings, in which:

FIGS. 28A, 28B and 28C are diagrams schematically illustrating process steps of polymerizing monomers;

FIG. 29 is a diagram illustrating the basic pixel configuration of a liquid crystal display device according to a third embodiment of the invention;

DESCRIPTION OF THE PREFERRED EMBODIMENT

First Embodiment

Figure 1:
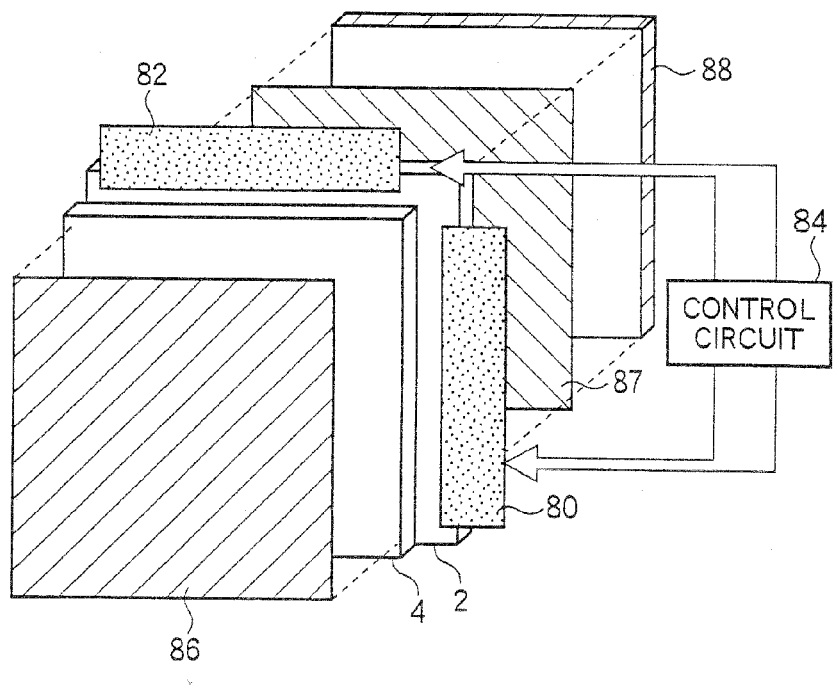
FIG. 1 is a diagram illustrating the schematic configuration of a liquid crystal display device according to a first embodiment of the invention.

A liquid crystal display device according to a first embodiment of the invention will be described with reference to FIGS. 1 to 8. FIG. 1 shows the schematic configuration of the liquid crystal display device according to this embodiment. As shown in FIG. 1, the liquid crystal display device has a TFT substrate 2 provided with a gate bus line and a drain bus line which are formed as they intersect with each other through an insulating film, and a TFT (switching element) and a pixel electrode which are formed at every pixel. In addition, the liquid crystal display device has a opposite substrate 4 on which a color filter (CF) and a common electrode are formed, and which is disposed facing the TFT substrate 2. Between the substrates 2 and 4, liquid crystals 6 are sealed (not shown in FIG. 1).

To the TFT substrate 2, drive circuits are connected: a gate bus line drive circuit 80 on which a driver IC is mounted to drive a plurality of the gate bus lines, and a drain bus line drive circuit 82 on which a driver IC is mounted to drive a plurality of the drain bus lines. These drive circuits 80 and 82 output a scanning signal and a data signal to a predetermined gate bus line or drain bus line based on a predetermined signal outputted from a control circuit 84. A polarizer 87 is arranged on the surface opposite to the surface of the TFT substrate 2 on which TFT elements are formed, and a polarizer 86 is disposed in crossed Nicol with the polarizer 87 on the surface opposite to the surface of the opposite substrate 4 on which the common electrode is formed. A backlight unit 88 is placed on the surface of the polarizer 87 opposite to the TFT substrate 2.

Figure 2:
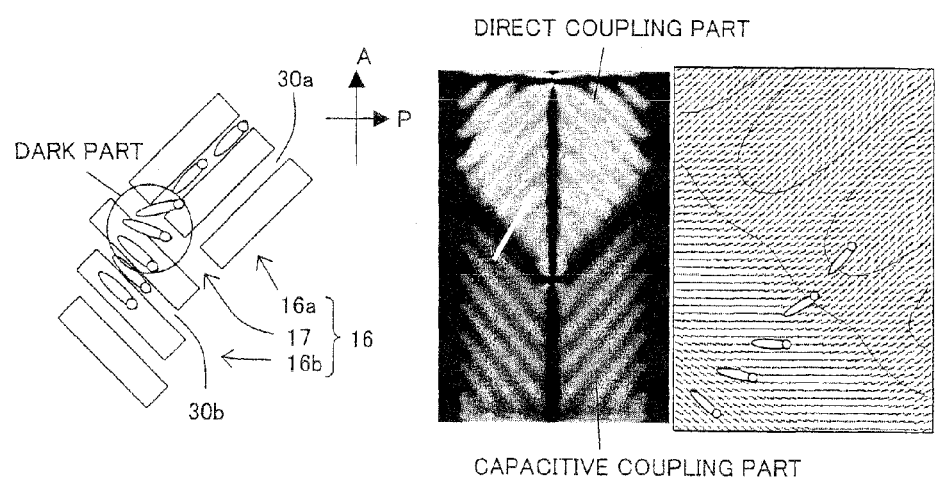
FIG. 2 is a diagram illustrating the principle of the liquid crystal display device according to the first embodiment of the invention.

In the embodiment, the combination of the alignment orientations of liquid crystals is optimized in a direct coupling part and a capacitive coupling part in a pixel area. FIG. 2 is a diagram illustrating the principle of the liquid crystal display device according to the embodiment. As shown in FIG. 2, in the embodiment, a pixel electrode 16 has a direct coupling part 16a which is electrically connected to a source electrode of the TFT, a capacitive coupling part 16b which is electrically insulated from the TFT and forms capacitance with a control capacitance electrode which has the same potential as that of the source electrode of the TFT, and a space 17 which is between the direct coupling part 16a and the capacitive coupling part 16b. For example, the pixel electrode 16 is formed of a transparent conductive film such as ITO. In addition, the direct coupling part 16a of the pixel electrode 16 has a plurality of micro slits 30a, and the capacitive coupling part 16b has a plurality of micro slits 30b. In the adjacent direct coupling part 16a and the capacitive coupling part 16b adjacent to each other through the space 17, the micro slits 30a and 30b are almost orthogonal to each other. Furthermore, the space (the area with no ITO) 17 which is the border between the direct coupling part 16a and the capacitive coupling part 16b is formed in a linear form having a straight part or a bend. The longitudinal direction of the space 17 is almost in parallel with the direction in which the micro slit 30b of the capacitive coupling part 16b is extended, and is almost vertically to the direction in which the micro slit 30a of the direct coupling part 16a is extended.

In the configuration shown in FIG. 2, the alignment orientation of the liquid crystal molecules between the direct coupling part 16a and the capacitive coupling part 16b is done by the rotation at an angle of 90 degrees, and only a single dark line is generated. In addition, since the tilt orientation of the liquid crystal molecules is matched with the alignment orientation of the direct coupling part 16a when the end of the direct coupling part 16a of the pixel electrode 16 works just like a main slit at the time when voltage is applied, the alignment orientation of liquid crystals becomes stabilized, and the φ fluctuations do not occur. Therefore, the alignment of liquid crystals in the space 17 between the direct coupling part 16a and the capacitive coupling part 16b is excellent overall, the dark lines are few, the light transmittance is high, and an effect to sufficiently improve a white patch can be obtained as well.

Figure 3:
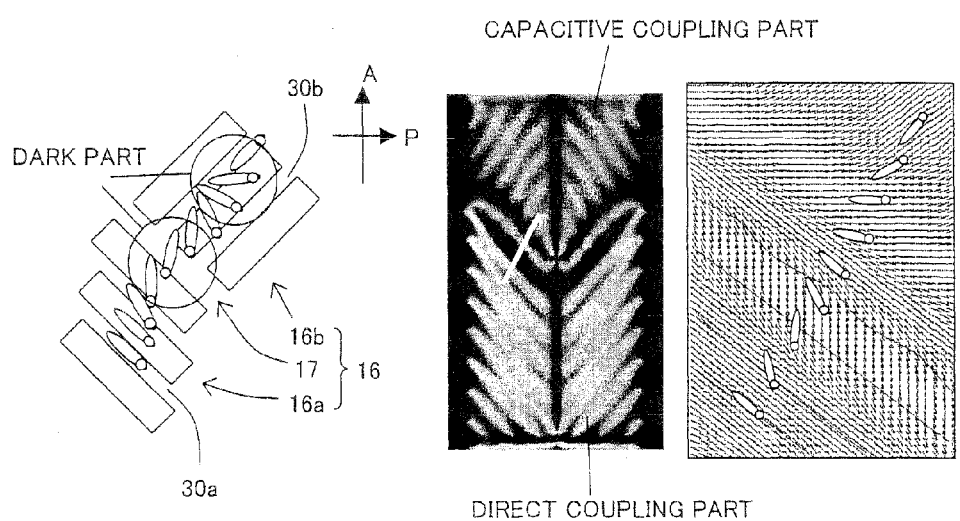
FIG. 3 is a diagram illustrating a comparative example of a liquid crystal display device according to the first embodiment of the invention.

On the other hand, in the case in which the layout of the direct coupling part 16a and the capacitive coupling part 16b is in reverse as a comparative example shown in FIG. 3, the edge of a direct coupling part 16a works to disturb the alignment, and thus the dark lines are increased. Therefore, an excellent alignment can be obtained only in the case of the layout of the direct coupling part 16a and the capacitive coupling part 16b as shown in FIG. 2.

In the embodiment, liquid crystals containing monomers are supported between the substrates 2 and 4, and the monomers are polymerized in the state in which voltage is applied to the liquid crystals. Accordingly, the alignment orientation of liquid crystals is controlled by the direction in which the micro slits 30a and 30b are extended. Here, the liquid crystals have negative dielectric anisotropy, and are vertically aligned when voltage is not applied.

Hereinafter, the liquid crystal display device according to the embodiment will be described more specifically with examples.

Example 1-1

Figure 4:
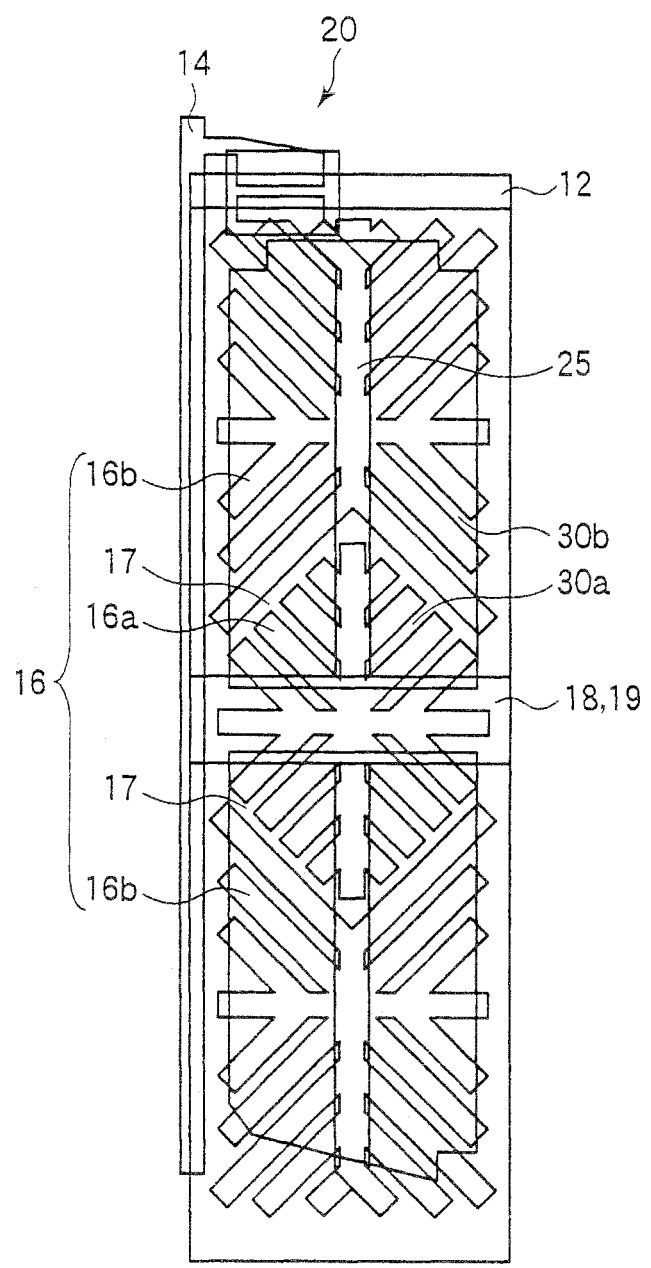
FIG. 4 is a diagram illustrating the single pixel configuration of a liquid crystal display device according to the example 1-1 of the first embodiment of the invention.

FIG. 4 shows the single pixel configuration of a liquid crystal display device according to the example 1-1 of the embodiment. As shown in FIG. 4, a pixel area is defined by a gate bus line 12 and a drain bus line 14 which intersect with each other through an insulating film. In the example, a direct coupling part 16a is disposed at the center of the pixel area, and a capacitive coupling part 16b is disposed at the upper part and the lower part in the pixel area as they sandwich the direct coupling part 16a in the drawing. The direct coupling part 16a is electrically connected to a source electrode of a TFT 20 through a contact hole and a control capacitance electrode 25. The capacitive coupling part 16b forms capacitance with the control capacitance electrode 25 which has the same potential as that of the source electrode of the TFT 20. In the example, alignment irregularities are basically small in a space 17 between the direct coupling part 16a and the capacitive coupling part 16b, and on the contrary, the alignment irregularities sometimes occur when a storage capacitor bus line 18, a storage capacitor electrode, etc. are disposed for light shielding. Therefore, the storage capacitor bus line and the storage capacitor electrode were not disposed there, and they were disposed in the area in which alignment irregularities were more likely to occur (the center part of the pixel in this example). The width of the space 17 is 3 to 5 µm, which is almost the same as the width of the micro slits 30a and 30b.

Example 1-2

Figure 5A:
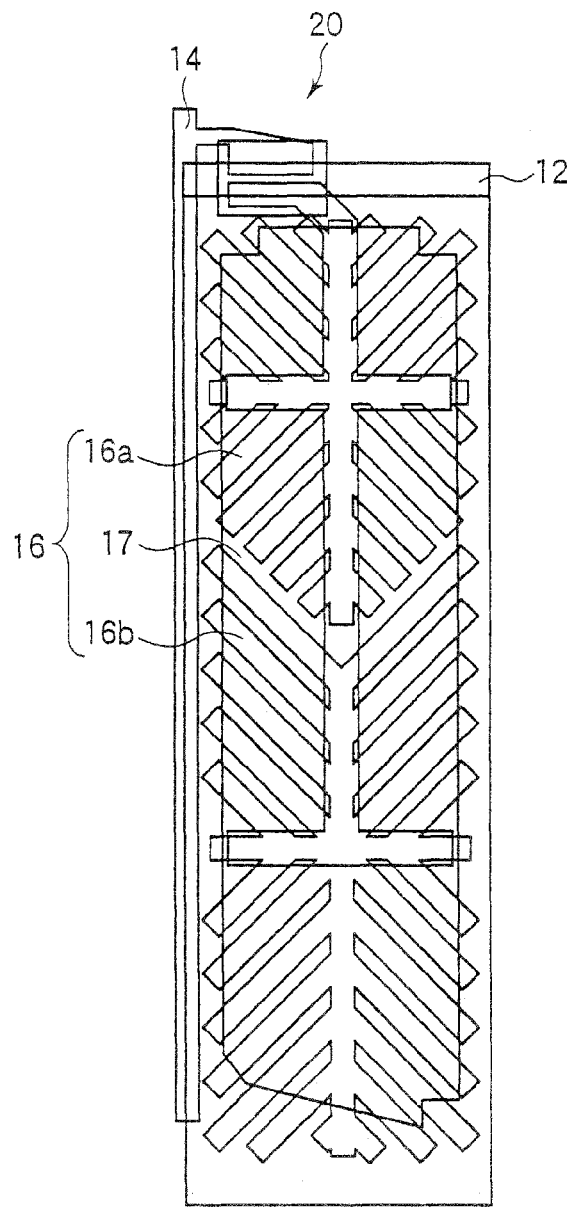
FIGS. 5A and 5B are diagrams illustrating the single pixel configuration of a liquid crystal display device according to the example 1-2 of the first embodiment of the invention.
Figure 5B:
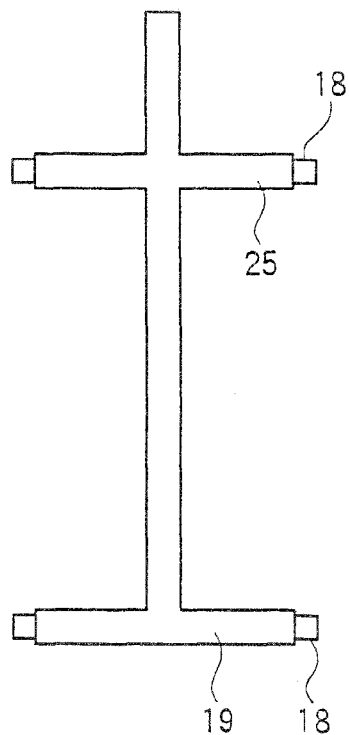
Figure 6:
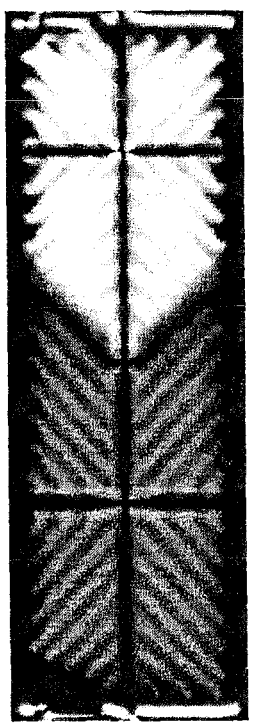
FIG. 6 is a diagram illustrating the simulation result of the display state of a single pixel in the liquid crystal display device according to the example 1-2 of the first embodiment of the invention.

FIG. 5A shows the single pixel configuration of a liquid crystal display device according to the example 1-2 of the embodiment, and FIG. 5B shows the layout of a storage capacitor bus line 18, a storage capacitor electrode 19 and a control capacitance electrode 25 in that pixel. FIG. 6 shows the simulation result of the display state of a pixel in the liquid crystal display device according to the embodiment. In the example 1-1 above, the pixel area is split into three parts, a single direct coupling part 16a and two capacitive coupling parts 16b. Therefore, five alignment split lines exist vertically including the space 17. Since these parts become the dark lines, a fewer number of alignment split lines is preferable. As shown in FIGS. 5A, 5B and 6, in the example, a direct coupling part 16a is disposed in the upper pixel area, and a capacitive coupling part 16b is disposed in the lower pixel area. The pixel area was split into two parts to reduce the number of the alignment split lines to three. Therefore, the pixel structure of a fewer number of dark lines and high brightness is obtained.

The direct coupling part 16a and the capacitive coupling part 16b each have four split areas in which micro slits are extended in directions different from each other (for example, in four orthogonal directions). The border between the split areas including a space 17 between the direct coupling part 16a and the capacitive coupling part 16b is the alignment split line. Since it is preferable not to dispose a storage capacitor electrode 19 etc. in the space 17, a control capacitance electrode 25, a storage capacitor electrode 19 and a storage capacitor bus line 18 are disposed in a capital I shape so that they are along the alignment split lines other than that. This is done also for securing an area which is necessary for an auxiliary capacitance electrode. For example, the width of the storage capacitor bus line 18 is 4 µm, and the width of the control capacitance electrode 25 is 8 µm. The storage capacitor electrode 19 etc. which reduce the aperture ratio as the light shielding area are disposed so as to overlap with the alignment split line which is basically dark, and thus a high light transmittance can be obtained.

Example 1-3

Figure 7:
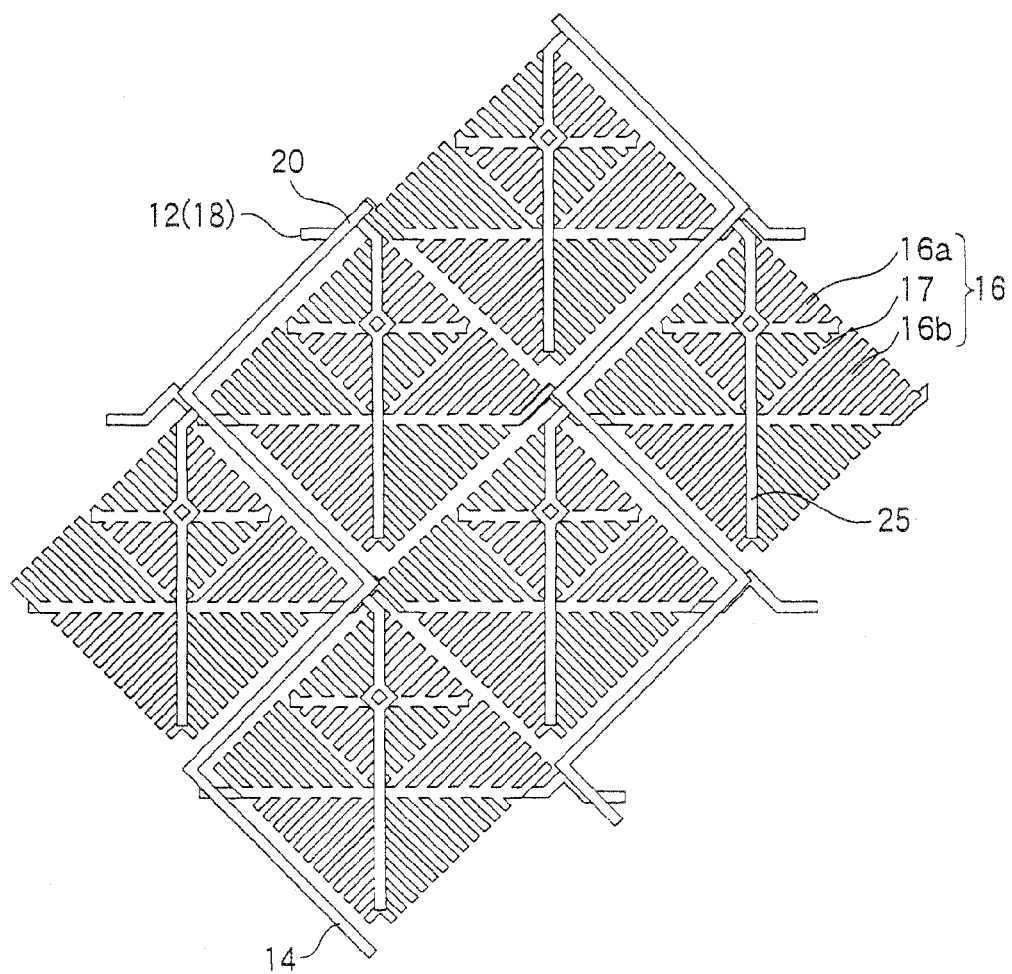
FIG. 7 is a diagram illustrating the configuration of six pixels in the liquid crystal display device according to the example 1-2 of the first embodiment of the invention.

FIG. 7 shows the configuration of six pixels of a liquid crystal display device according to the example 1-3 of the embodiment. As shown in FIG. 7, in the example, a structure was formed in which the form of the edge of a pixel electrode 16 is optimized, and all the cuts of a direct coupling part 16a and a capacitive coupling part 16b are orthogonal to the direction in which a micro slit is extended. In addition, in the example, a gate bus line 12 also serves as a storage capacitor bus line 18. According to the example, the alignment of the pixel edge becomes excellent, and the brightness and the viewing angle characteristic are both improved.

Figure 8:
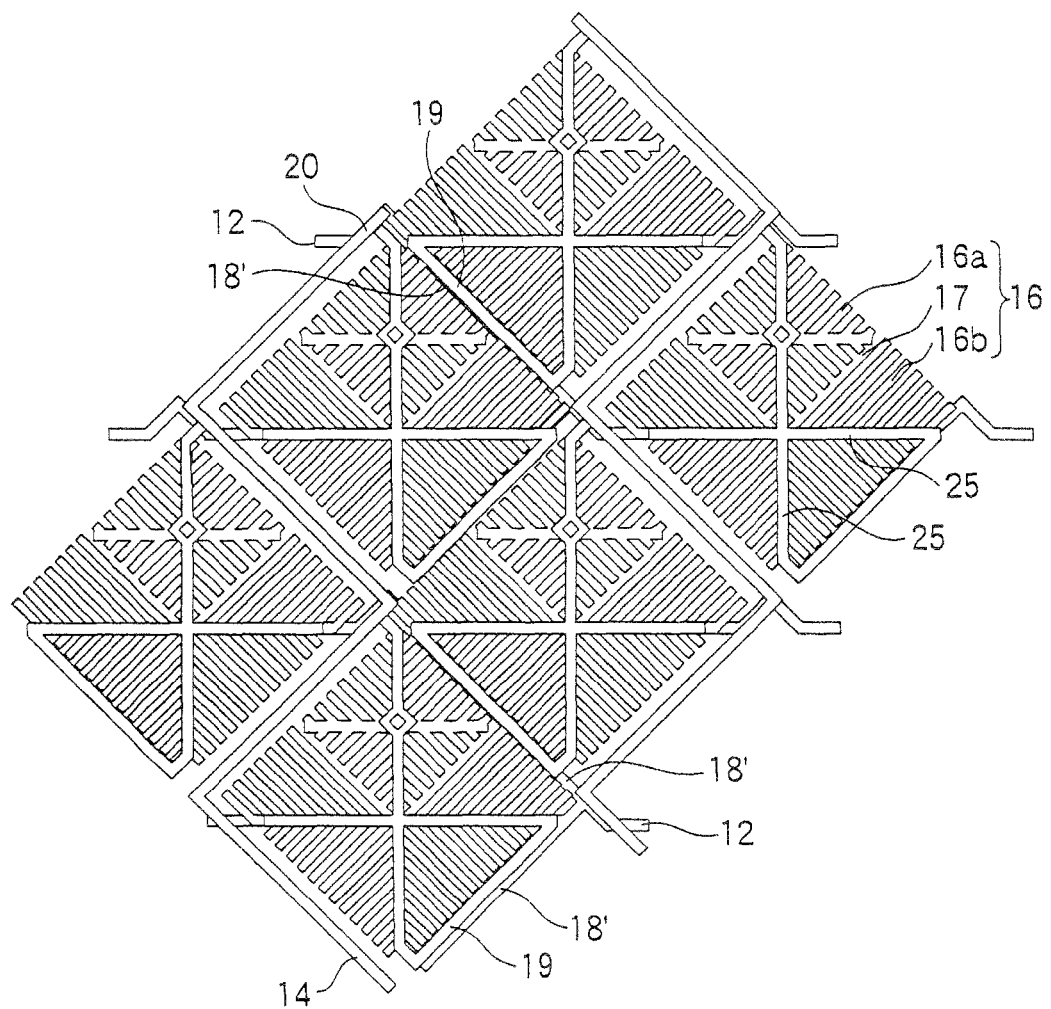
FIG. 8 is a diagram illustrating a modification of the configuration of the liquid crystal display device according to the example 1-2 of the first embodiment of the invention.

FIG. 8 shows a modification of the configuration of the liquid crystal display device according to the embodiment. As shown in FIG. 8, in the modification, in order to secure storage capacitor, a storage capacitor branch wiring 18' which is branched from the gate bus line 12, a storage capacitor electrode 19 and a control capacitance electrode 25 are extended around the pixel.

Second Embodiment

Next, a liquid crystal display device according to a second embodiment of the invention will be described with reference to FIGS. 9 to 26. As described above, in the liquid crystal display device in the VA mode, the phase difference caused by birefringence in the oblique direction is greatly shifted from that in the front direction. On this account, the display color is shifted between the time when a screen is viewed from the front direction and the time when the screen is viewed from the oblique direction. This is a phenomenon called a color shift. The color shift occurs by shifting the gray level brightness characteristic in the oblique direction, that is, the γ characteristic from a characteristic set value in the front direction.

Figure 36:
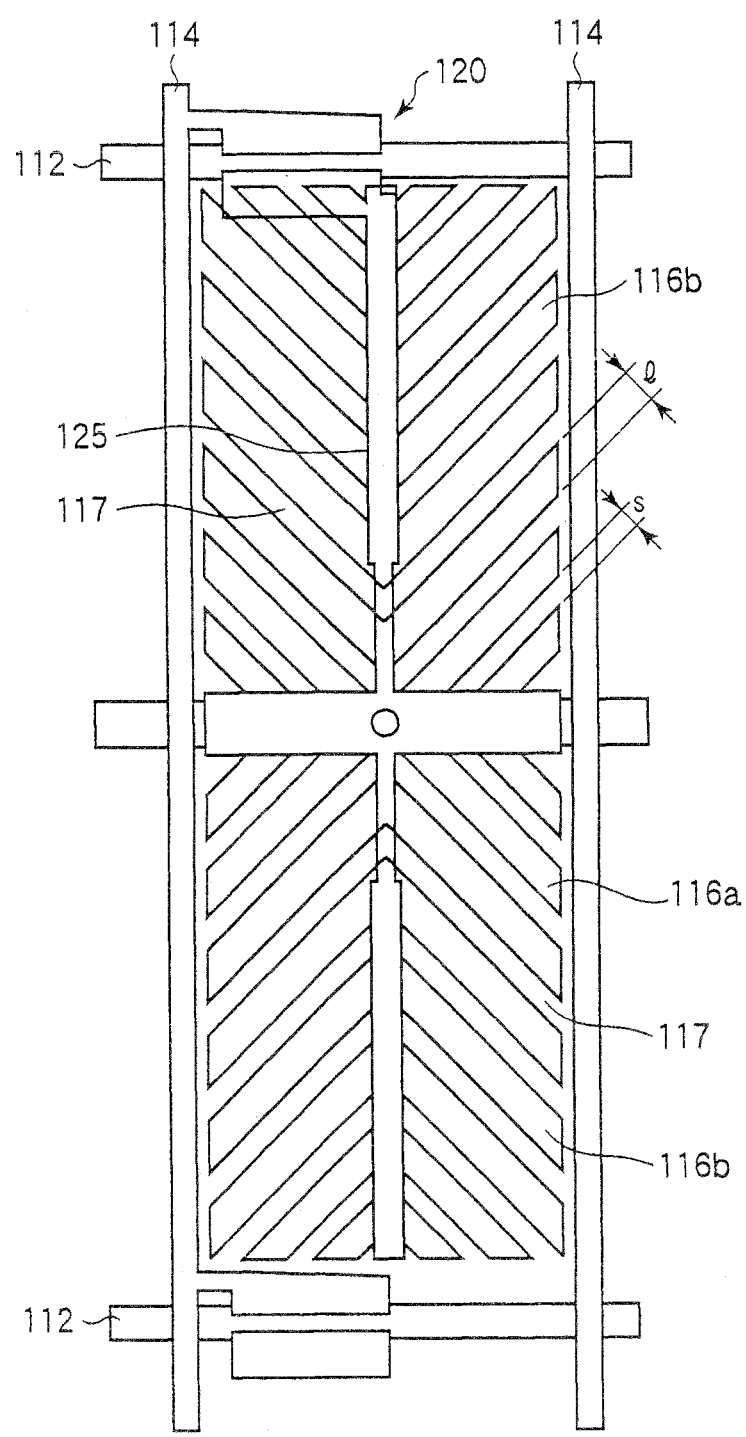
FIG. 36 is a diagram illustrating the pixel structure of the liquid crystal display device in the MVA mode.
Figure 37A:
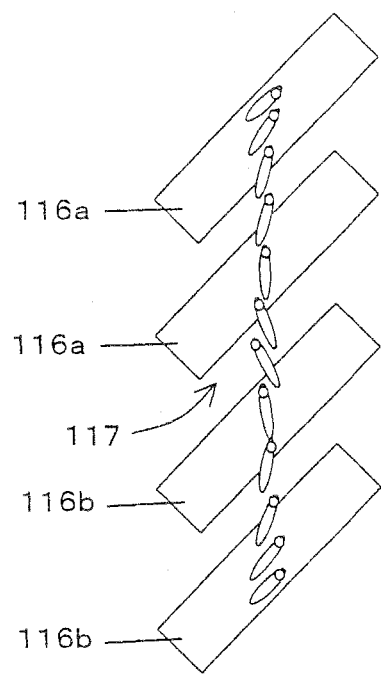
FIGS. 37A and 37B are diagrams illustrating a problem of the liquid crystal display device in the MVA mode.
Figure 37B:
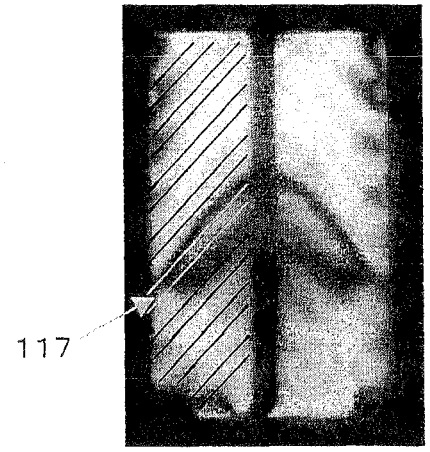

This problem can be improved by the liquid crystal display device having the pixel structure shown in FIG. 36. The alignment orientation of liquid crystals in a single pixel is split in the azimuth angle direction as well as in the polar angle direction, and thus the variation in the phase difference in the polar angle direction is also averaged to reduce the color shift.

Figure 9:
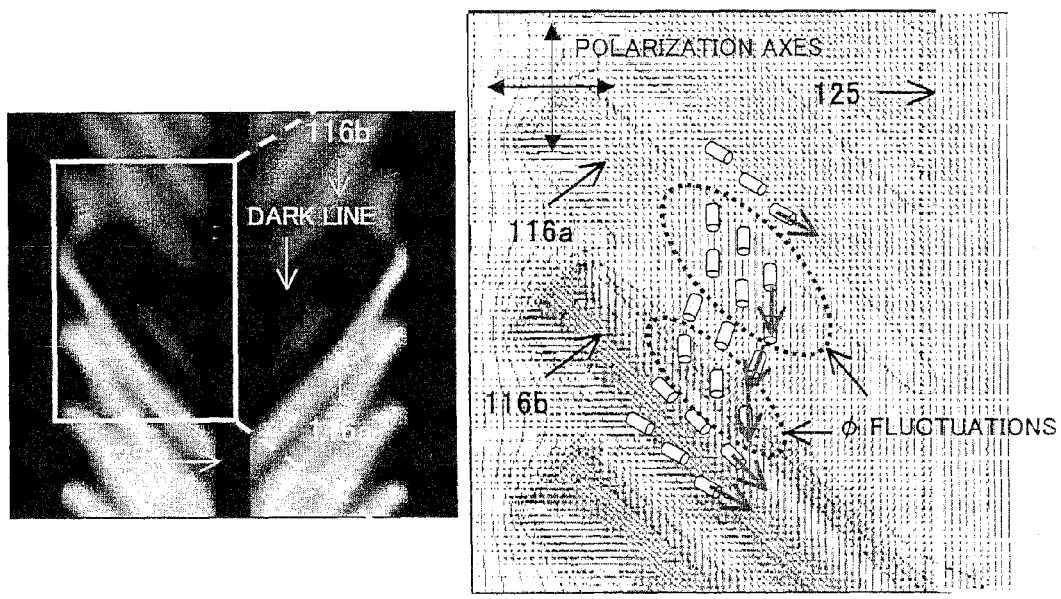
FIG. 9 is a diagram illustrating a problem of a liquid crystal display device having the pixel structure shown in FIG. 36.

However, in this mode, there is a problem that a potential difference is generated between the direct coupling part 116a having a larger applied voltage and the capacitive coupling part 116b having a smaller applied voltage and that potential difference causes the alignment orientation of liquid crystals in the space 117 to shift from the orientation controlled by the micro slit 116d of the pixel electrode 116. FIG. 9 schematically shows the alignment of liquid crystals. As shown in FIG. 9, in the border area between a direct coupling part 116a and a capacitive coupling part 116b, the alignment of liquid crystals is greatly disturbed to generate a dark line caused by the φ fluctuations. When the dark line is generated in the display area, not only the transmittance is reduced but the color shift becomes greater.

Figure 10:
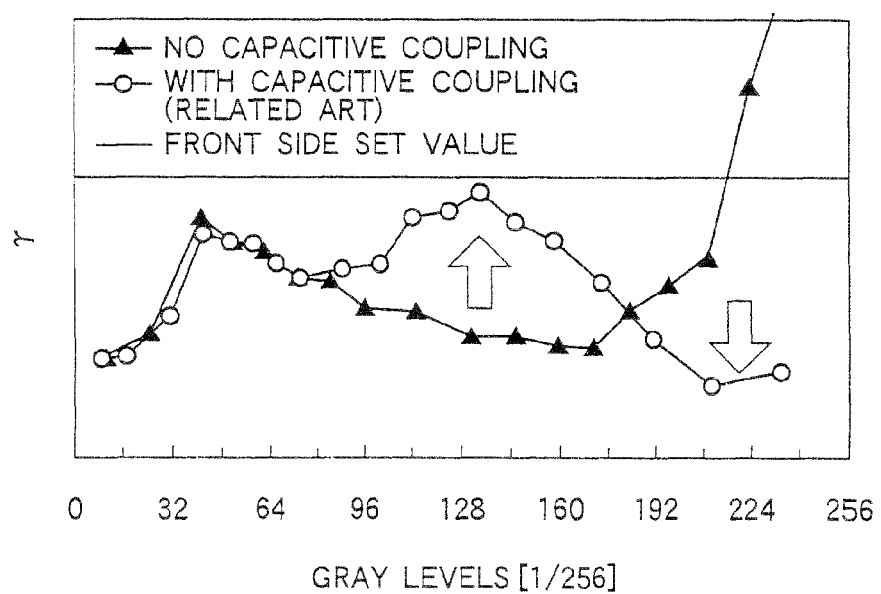
FIG. 10 is a graph illustrating the gray level γ characteristic in the oblique direction.

FIG. 10 shows a graph illustrating the gray level γ characteristic in the oblique direction. As shown in FIG. 10, the capacitive coupling part 116b is disposed in the pixel to make the γ value in the range of the halftone levels close to a set value on the front side, and the color shift in the halftone levels is improved. However, since the γ value in the range of high gray levels is shifted from the set value on the front side, a problem arises that the color shift in the high gray levels is great.

The embodiment is made to solve the problem, and an object is to provide a bright liquid crystal display device having a small color shift.

The object is achieved by a liquid crystal display device including: sandwiching liquid crystals containing polymerizable monomers between a first substrate provided with a pixel electrode having a micro slit and a second substrate facing the first substrate; polymerizing the monomers as voltage is applied to the liquid crystals; and controlling an alignment orientation of the liquid crystals to a direction in which the micro slit is extended, wherein the pixel electrode includes: a direct coupling part which is electrically connected to a switching element; and a capacitive coupling part which is electrically insulated from the switching element, and which forms capacitance with a control capacitance electrode which has a same potential as that of a source electrode of the switching element, wherein the direct coupling part and the capacitive coupling part are isolated from each other at a border of the control capacitance electrode and/or a storage capacitor bus line.

In the liquid crystal display device according to the embodiment, in an area in which the control capacitance electrode and the storage capacitor bus line overlap with each other, the control capacitance electrode is disposed inside the storage capacitor bus line.

In the liquid crystal display device according to the embodiment, in an area in which the control capacitance electrode and the pixel electrode overlap with each other, the control capacitance electrode is disposed inside the pixel electrode.

In the liquid crystal display device according to the embodiment, the alignment orientation of the liquid crystals is split at a border of the control capacitance electrode or the storage capacitor bus line.

In the liquid crystal display device according to the embodiment, the direction in which the micro slit is extended as adjacent to the gate bus line or the drain bus line is almost vertical to a direction in which the gate bus line or the drain bus line is extended.

In the liquid crystal display device according to the embodiment, the direct coupling part of the pixel electrode is disposed on a source electrode side of the switching element.

In the liquid crystal display device according to the embodiment, the pixel electrode is not formed in an area facing a resin spacer which is formed on the second substrate.

In the liquid crystal display device according to the embodiment, light is shielded in a part adjacent to the control capacitance electrode and/or the storage capacitor bus line in the pixel electrode by a black matrix which is formed on the second substrate.

Figure 11:
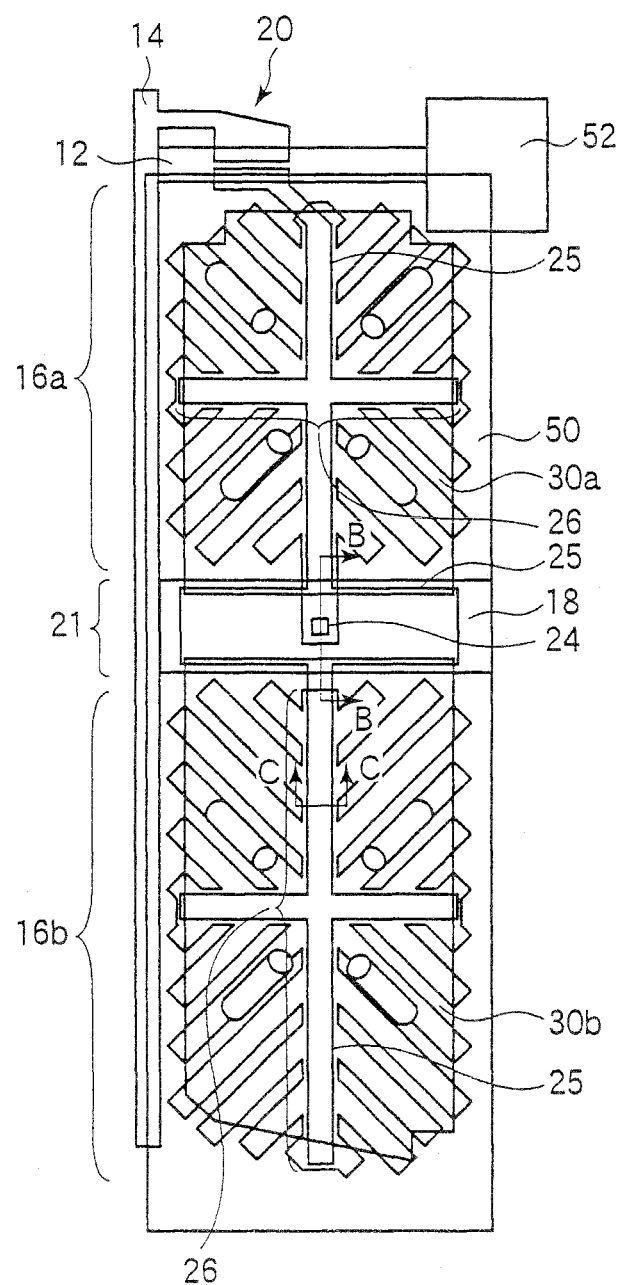
FIG. 11 is a diagram illustrating a first basic pixel configuration of a liquid crystal display device according to a second embodiment of the invention.
Figure 12:
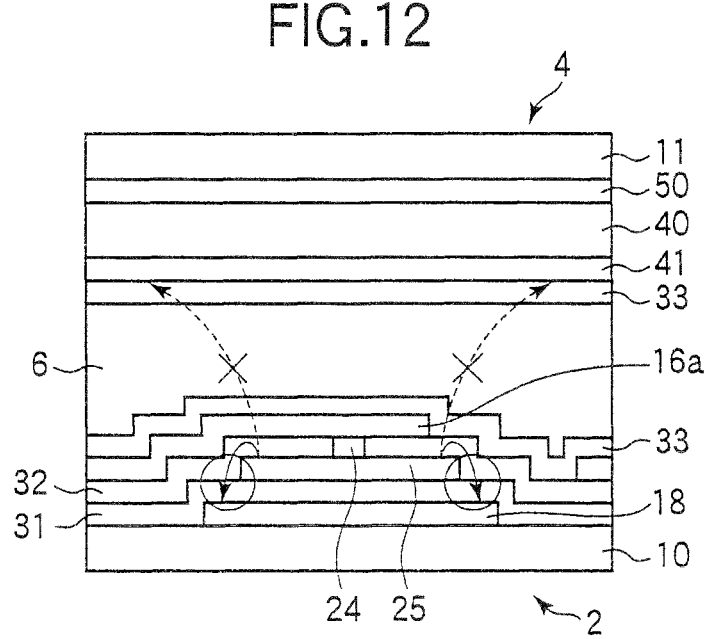
FIG. 12 is a cross section illustrating the first basic pixel configuration of the liquid crystal display device according to the second embodiment of the invention.
Figure 13:
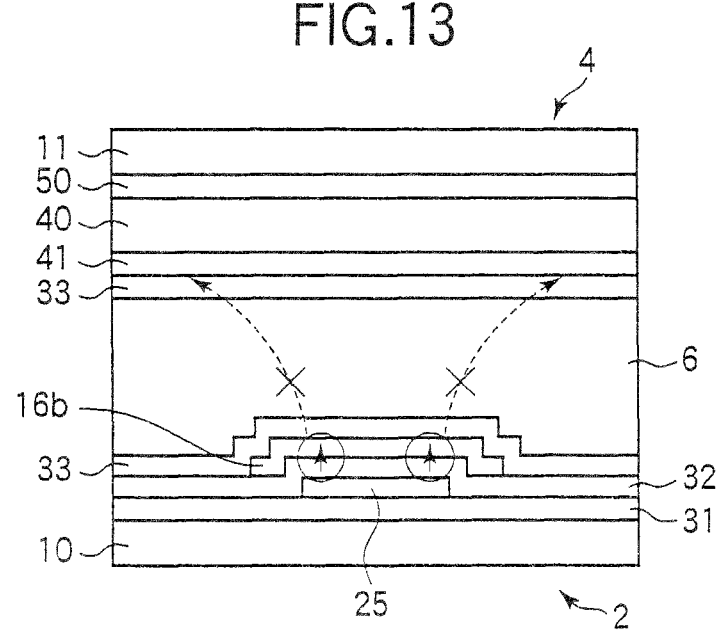
FIG. 13 is a cross section illustrating the first basic pixel configuration of the liquid crystal display device according to the second embodiment of the invention.

FIG. 11 shows a first basic pixel configuration of the liquid crystal display device according to the embodiment. FIG. 12 shows the sectional configuration of the liquid crystal display device sectioned at line B-B shown in FIG. 11, and FIG. 13 shows the sectional configuration of the liquid crystal display device sectioned at line C-C shown in FIG. 11. As shown in FIGS. 11 to 13, the liquid crystal display device has a TFT substrate 2, a opposite substrate 4, and liquid crystals 6 which are sealed between the substrates 2 and 4. On the interface between the substrates sandwiching the liquid crystals 6, a polymerized film is formed which is formed by polymerizing monomers mixed in the liquid crystals 6 with voltage applied. A pixel electrode 16 formed on the TFT substrate 2 has a direct coupling part 16a which is electrically connected to a source electrode of a TFT 20, and a capacitive coupling part 16b which forms capacitance with a control capacitance electrode 25 which is electrically connected to the source electrode. The direct coupling part 16a and the capacitive coupling part 16b are isolated from each other at the border of a storage capacitor part 21. The direct coupling part 16a is formed with a micro slit 30a, and the capacitive coupling part 16b is formed with a micro slit 30b. The alignment orientation of the liquid crystals 6 is controlled by the direction in parallel with the direction in which the micro slits 30a and 30b are extended.

In addition, preferably, in the area in which the control capacitance electrode (storage capacitor electrode) 25 and a storage capacitor bus line 18 overlap with each other, the control capacitance electrode 25 is disposed inside the storage capacitor the bus line 18, and in the area in which the control capacitance electrode 25 and the pixel electrode 16 overlap with each other, the control capacitance electrode 25 is disposed inside the pixel electrode 16, and the alignment orientation of the liquid crystals 6 is split at the border of the control capacitance electrode 25 or the storage capacitor bus line 18.

Figure 14:
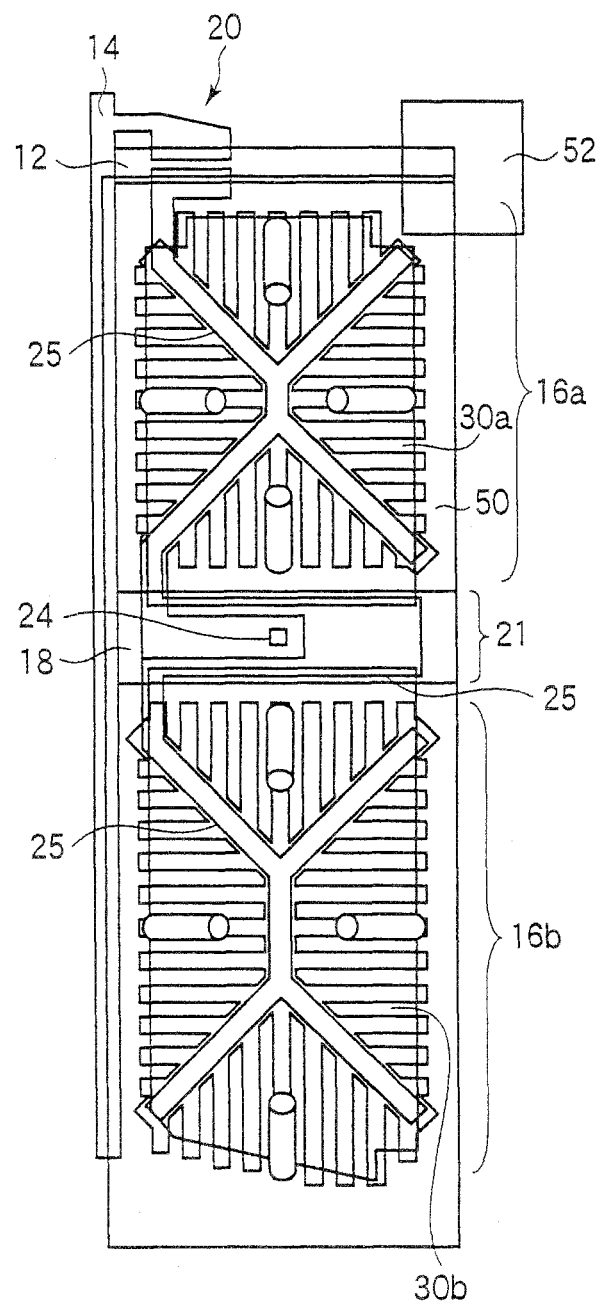
FIG. 14 is a diagram illustrating a second basic pixel configuration of the liquid crystal display device according to the second embodiment of the invention.

FIG. 14 shows a second basic pixel configuration of the liquid crystal display device according to the embodiment. As shown in FIG. 14, the direction in which the micro slits 30a and 30b are extended as adjacent to a gate bus line 12 or a drain bus line 14 is almost vertical to the direction in which the gate bus line 12 or the drain bus line 14 is extended.

As shown in FIG. 14, the direct coupling part 16a and the capacitive coupling part 16b are isolated from each other at the border of the storage capacitor part 21 to eliminate a dark line caused by the fluctuations generated in the border area between the direct coupling part 16a and the capacitive coupling part 16b. More specifically, the direct coupling part 16a having a greater applied voltage is isolated from the capacitive coupling part 16b having a smaller applied voltage at the border of the storage capacitor part 21, and thus the dark line caused by the $\phi$ fluctuations is fixed to the storage capacitor part 21 to prevent the dark line from being generated in the display area.

In addition, preferably as shown in FIG. 12, in the area in which the control capacitance electrode 25 and the storage capacitor bus line 18 overlap with each other, the control capacitance electrode 25 is formed inside the storage capacitor bus line 18. Accordingly, the oblique electric field of the control capacitance electrode 25 can be cancelled at the storage capacitor bus line 18, and thus the alignment orientation of the liquid crystals 6 near the storage capacitor part 21 can be aligned with the orientation controlled by the micro slits 30a and 30b. To the contrary, when the control capacitance electrode 25 is formed outside the storage capacitor bus line 18, the oblique electric field of the control capacitance electrode 25 and the oblique electric field of the pixel electrode 16 interfere with each other near the storage capacitor part 21, and the alignment orientation of the liquid crystals 6 is shifted from the orientation controlled by the micro slits 30a and 30b. It causes no problem when the distance between the control capacitance electrode 25 and the pixel electrode 16 is sufficiently long, but in this case, the transmittance is reduced.

In addition, preferably as shown in FIG. 13, in the area in which the control capacitance electrode 25 and the pixel electrode 16 overlap with each other, the control capacitance electrode 25 is formed inside the pixel electrode 16. Accordingly, the oblique electric field of the control capacitance electrode 25 can be cancelled at the pixel electrode 16, and thus the alignment orientation of the liquid crystals 6 near a backbone part 26 formed by the control capacitance electrode 25 and the pixel electrode 16 can be aligned with the orientation controlled by the micro slits 30a and 30b. To the contrary, when the control capacitance electrode 25 is formed outside the pixel electrode 16, the oblique electric field of the control capacitance electrode 25 and the oblique electric field of the pixel electrode 16 interfere with each other, and the alignment orientation of the liquid crystals 6 is shifted from the orientation controlled by the micro slits 30a and 30b.

In addition, preferably as shown in FIG. 11, the alignment orientation of the liquid crystals 6 is split at the border of the control capacitance electrode 25 or the storage capacitor bus line 18. Accordingly, light at the alignment border of the liquid crystals 6 in which the φ fluctuations are relatively great can be shielded by the control capacitance electrode 25 or the storage capacitor bus line 18, and thus a color shift can be made smaller.

Furthermore, as shown in FIG. 14, the direction in which the micro slits 30a and 30b are extended as adjacent to the gate bus line 12 or the drain bus line 14 is made almost vertical to the direction in which the gate bus line 12 or the drain bus line 14 is extended. Accordingly, the direction of the oblique electric field of the pixel electrode 16 and the direction of the oblique electric field of the pixel space can be made the same, and thus the alignment orientation of the liquid crystals 6 near the gate bus line 12 and the drain bus line 14 can be aligned with the orientation controlled by the micro slits 30a and 30b.

Hereinafter, the liquid crystal display device according to the embodiment will be described more specifically with examples.

Example 2-1

Figure 15:
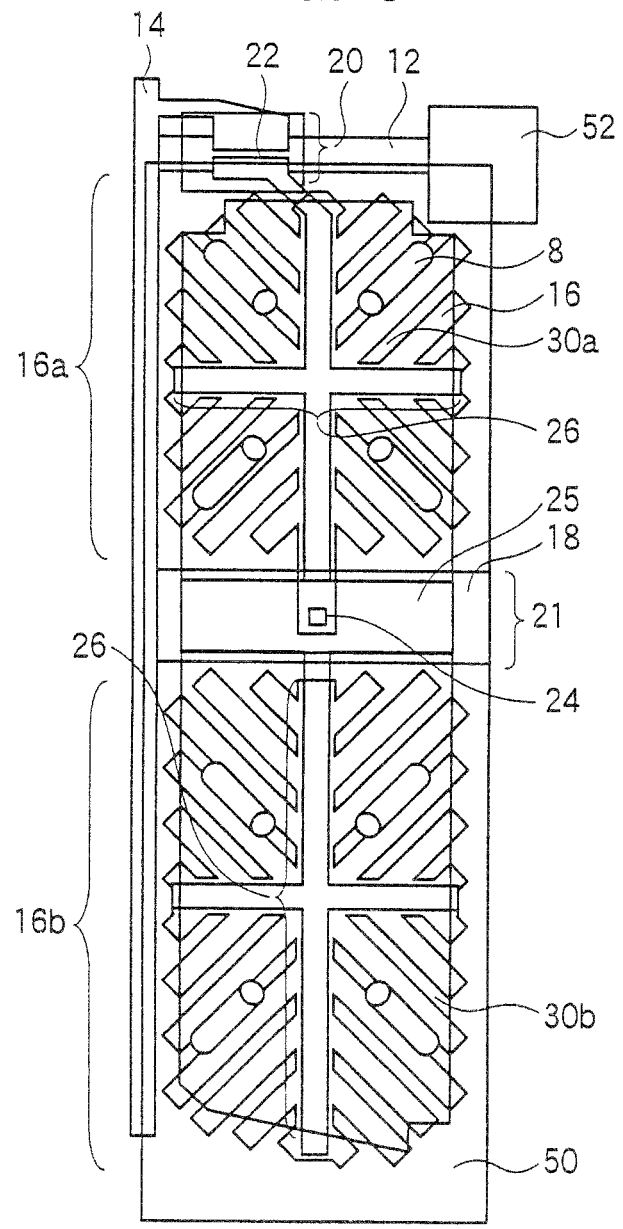
FIG. 15 is a diagram illustrating the pixel configuration of a liquid crystal display device according to the example 2-1 of the second embodiment of the invention.
Figure 16:
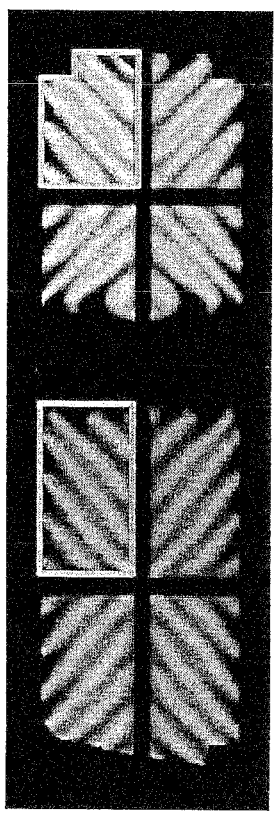
FIG. 16 is a diagram illustrating the pixel alignment of the liquid crystal display device according to the example 2-1 of the second embodiment of the invention.
Figure 17:
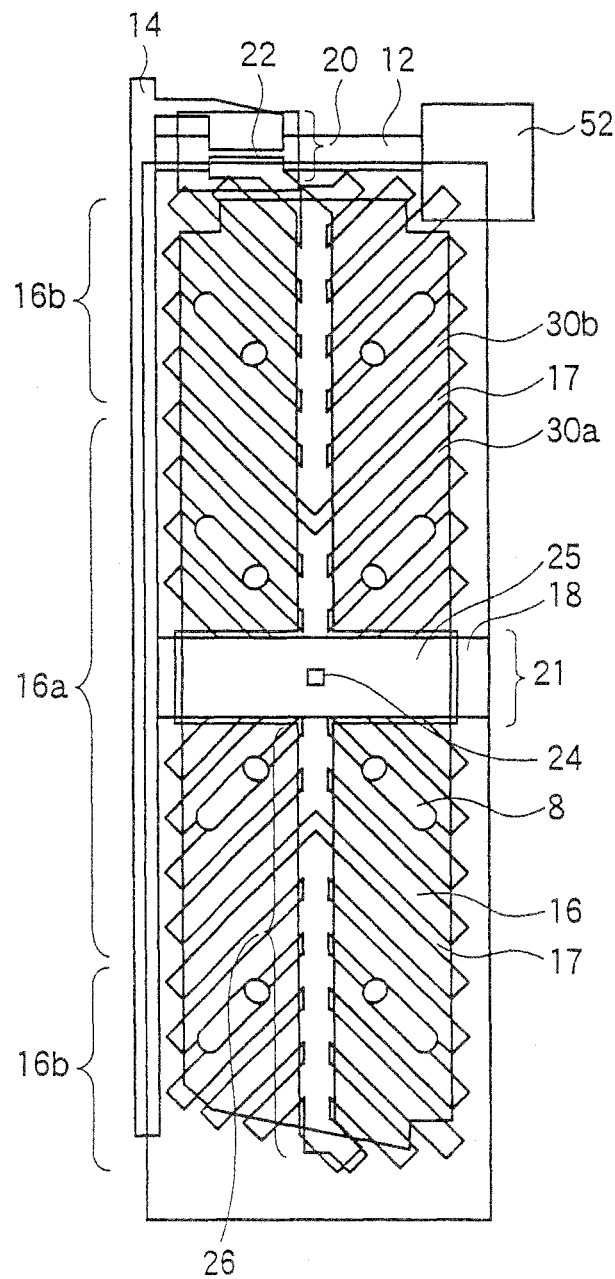
FIG. 17 is a diagram illustrating the pixel configuration of a liquid crystal display device according to the comparative example 2-1 of the second embodiment of the invention.
Figure 18:
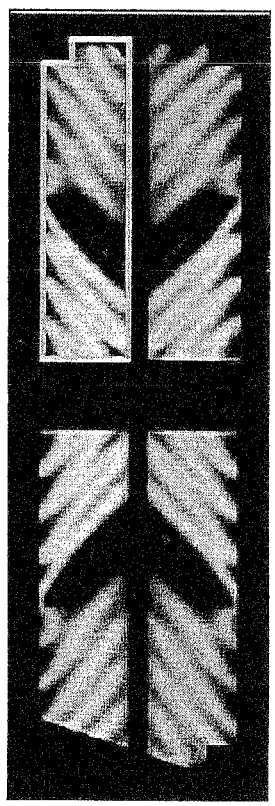
FIG. 18 is a diagram illustrating the pixel alignment of the liquid crystal display device according to the comparative example 2-1 of the second embodiment of the invention.

FIG. 15 shows the pixel configuration of a liquid crystal display device according to the example 2-1 of the embodiment, and FIG. 16 shows the pixel alignment of the liquid crystal display device according to the example. FIG. 17 shows the pixel configuration of a liquid crystal display device according to the comparative example 2-1, and FIG. 18 shows the pixel alignment of the liquid crystal display device according to the comparative example 2-1. As shown in FIG. 17, in the liquid crystal display device according to the comparative example, a direct coupling part 16a and a capacitive coupling part 16b are not isolated from each other at the border of a storage capacitor part 21. A pixel electrode 16 is formed to have a line width of 6 μm, and has micro slits 30a and 30b which are extended at azimuth angles of 45, 135, 225 and 315 degrees at a slit width of 3.5 μm. Voltage is applied to liquid crystals 6 to polymerize monomers to control the alignment of the liquid crystals 6 in the direction in which the micro slits 30a and 30b are extended. Here, the liquid crystals 6 have negative dielectric anisotropy, and are aligned vertically when voltage is not applied. In addition, in the case in which the liquid crystals 6 have positive dielectric anisotropy and are aligned horizontally when voltage is not applied, the applied voltage in polymerizing monomers cannot be made greater. Therefore, it becomes difficult to control the alignment orientation of the liquid crystals 6 to the direction in which the micro slits 30a and 30b are extended.

In addition, the pixel electrode 16 is formed of a direct coupling part 16a which is electrically connected to a source electrode 22 of a TFT 20, and a capacitive coupling part 16b which is electrically insulated from the TFT 20, and which forms capacitance with a control capacitance electrode 25 which is electrically connected to the source electrode 22. The direct coupling part 16a is electrically connected to the TFT 20 through a contact hole 24 which is formed at the center part of the pixel area.

In the pixel layout of the comparative example, a direct coupling part 16a and a capacitive coupling part 16b are not isolated from each other at the border of a storage capacitor part 21. Therefore, as the pixel alignment as shown in FIG. 18, a potential difference is generated in the border area between the direct coupling part 16a having a greater applied voltage and the capacitive coupling part 16b having a smaller applied voltage, and the alignment orientation of the liquid crystals 6 is greatly shifted from the orientation controlled by the micro slits 30a and 30b to generate a dark line caused by the φ fluctuations.

On the other hand, in the pixel layout of the example shown in FIG. 15, since the direct coupling part 16a and the capacitive coupling part 16b are isolated from each other at the border of the storage capacitor part 21, the dark line caused by the φ fluctuations is fixed to the storage capacitor part 21 to eliminate it from the display area as the pixel alignment shown in FIG. 16. In addition, in the pixel layout shown in FIG. 15, (1) in the area in which the control capacitance electrode 25 and a storage capacitor bus line 18 overlap with each other, the control capacitance electrode 25 is disposed inside the storage capacitor bus line 18;

(2) in the area in which the control capacitance electrode 25 and the pixel electrode 16 overlap with each other, the control capacitance electrode 25 is disposed inside the pixel electrode 16;

(3) the alignment orientation of the liquid crystals 6 is split at the border of the control capacitance electrode 25 or the storage capacitor bus line 18;

(4) the direct coupling part 16a of the pixel electrode is disposed on the source electrode 22 side of the TFT 20 in the pixel area; and (5) the pixel electrode 16 is not formed in the area facing a resin spacer 52 which is formed on a opposite substrate 4.

The cross section near the capacitive coupling part 16b in the pixel layout shown in FIG. 15 is as shown in FIG. 12. As shown in FIG. 12, on a glass substrate 10 of a TFT substrate 2, the storage capacitor bus line 18, a gate insulating film 31, the control capacitance electrode 25, a final protective film 32, the pixel electrode 16 (direct coupling part 16a), and a vertical alignment film 33 are sequentially formed. The control capacitance electrode 25 is electrically connected to the pixel electrode 16 through a contact hole 24. On the other hand, on a glass substrate 11 of the opposite substrate 4, a black matrix (BM) 50, a color filter layer 40, a common electrode 41, and a vertical alignment film 33 are sequentially formed.

As in (1) above, the control capacitance electrode 25 is formed inside the storage capacitor bus line 18, and thus the oblique electric field of the control capacitance electrode 25 can be cancelled at the storage capacitor bus line 18. Therefore, the alignment orientation of the liquid crystals 6 near the storage capacitor part 21 can be aligned with the orientation controlled by the micro slits 30a and 30b. Since the direction (arrow) of the oblique electric field is controlled in the direction in which the electric field is stronger, the oblique electric field is generated in the direction in which the distance between the electrodes is short in the case in which the potential is almost the same as with the storage capacitor bus line 18 and the common electrode 41. Accordingly, the oblique electric field of the control capacitance electrode 25 can be suppressed from being generated outside the storage capacitor part 21.

The cross section near the backbone part 26 in the pixel layout shown in FIG. 15 is as shown in FIG. 13. On the glass substrate 10 of the TFT substrate 2, the gate insulating film 31, the control capacitance electrode 25, the final protective film 32, the pixel electrode 16, and the vertical alignment film 33 are sequentially formed, and on the glass substrate 11 of the opposite substrate 4, the BM 50, the color filter layer 40, the common electrode 41, and the vertical alignment film 33 are sequentially formed.

As in (2) above, the control capacitance electrode 25 is formed inside the pixel electrode 16, and thus the oblique electric field of the control capacitance electrode 25 can be cancelled at the pixel electrode 16. Thus, the alignment orientation of the liquid crystals 6 near the backbone part 26 formed by the control capacitance electrode 25 and the pixel electrode 16 can be aligned with the orientation controlled by the micro slits 30a and 30b. In the case in which a potential difference exists as with the pixel electrode 16 and the common electrode 41, the control capacitance electrode 25 is shielded by the pixel electrode 16, and thus the oblique electric field of the control capacitance electrode 25 can be suppressed from being generated outside the pixel electrode 16.

As in (3) above, the alignment orientation of the liquid crystals 6 is split at the border of the control capacitance electrode 25 or the storage capacitor bus line 18, the alignment border of the liquid crystals 6 at which the φ fluctuations are relatively great can be shielded by the control capacitance electrode 25 or the storage capacitor bus line 18, and thus the φ fluctuations can be seemingly made small.

As in (4) above, the direct coupling part 16a of the pixel electrode 16 is formed on the source electrode 22 side of the TFT 20, and thus the potential difference between the source electrode 22 and the pixel electrode 16 near the TFT 20 can be eliminated. Therefore, the alignment orientation of the liquid crystals 6 near the TFT 20 can be aligned with the orientation controlled by the micro slits 30a and 30b.

As in (5) above, the pixel electrode 16 is removed from the area facing the resin spacer 52 formed on the opposite substrate 4, and thus it can be eliminated that the resin spacer 52 distorts the oblique electric field of the pixel electrode 16. Therefore, the alignment orientation of the liquid crystals 6 near the resin spacer 52 can be aligned with the orientation controlled by the micro slits 30a and 30b.

Example 2-2

Figure 19:
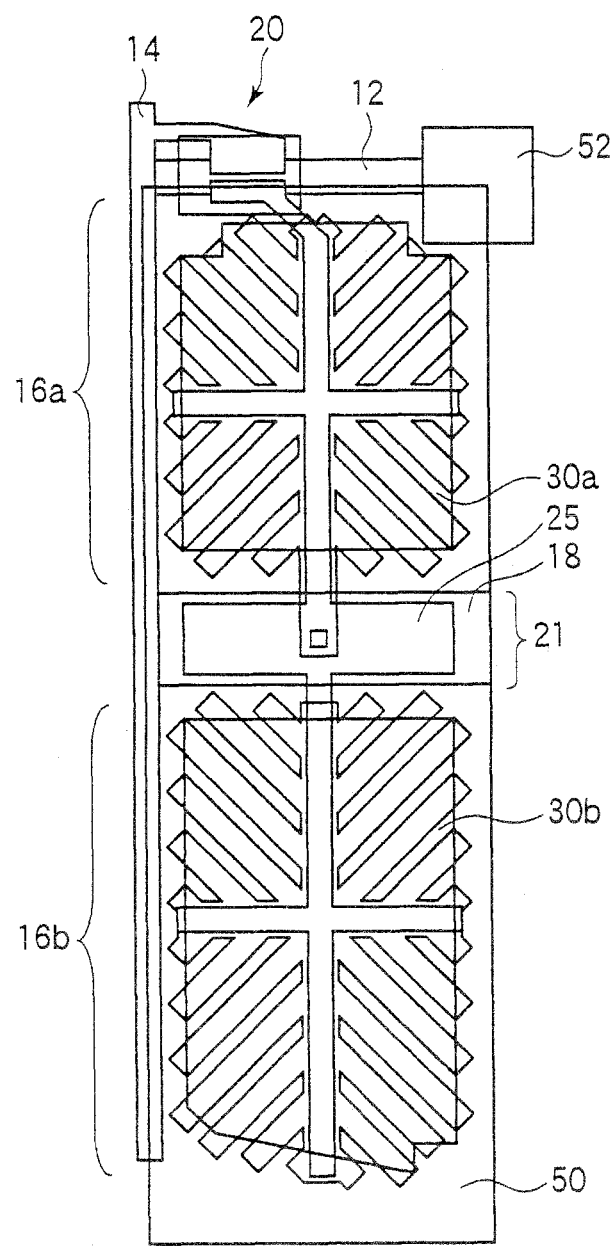
FIG. 19 is a diagram illustrating the pixel configuration of liquid crystal display device according to the example 2-2 of the second embodiment of the invention.
Figure 20:
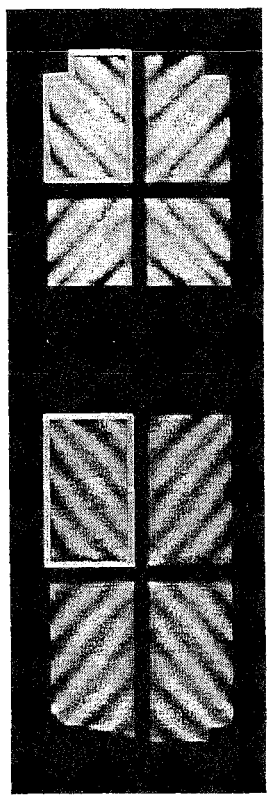
FIG. 20 is a diagram illustrating the pixel alignment of the liquid crystal display device according to the example 2-2 of the second embodiment of the invention.

FIG. 19 shows the pixel configuration of a liquid crystal display device according to the example 2-2 of the embodiment, and FIG. 20 shows the pixel alignment of the liquid crystal display device according to the example. As shown in FIG. 19, in the example, a direct coupling part 16a and a capacitive coupling part 16b are isolated from each other at the border of a storage capacitor part 21, and light at the part of the pixel electrodes 16a and 16b adjacent to the storage capacitor part 21 is shielded by a BM 50 which is formed on a opposite substrate 4. The configuration in the example is almost the same as that of the example 2-1 except the BM 50.

In the example 2-1 and the comparative example 2-1, light in the area adjacent to the gate bus line 12 or the drain bus line 14 is shielded for cross talk measures, but light in the area adjacent to the storage capacitor part 21 is not shielded because that area is not involved in cross talk measures. However, in the examples 2-1 and 2-2, the direct coupling part 16a and the capacitive coupling part 16b are isolated from each other at the border of the storage capacitor part 21, and thus the area adjacent to the storage capacitor part 21 is the pixel electrode end as similar to the area adjacent to the gate bus line 12 or the drain bus line 14. Therefore, the φ fluctuations near the storage capacitor part 21 are relatively great. As compared with the pixel alignment of the example 2-1 shown in FIG. 16, in the pixel alignment of the example shown in FIG. 20, the dark line in the area adjacent to the storage capacitor part 21 is as small as that in the area adjacent to the gate bus line 12 or the drain bus line 14.

Pixel Evaluation in Examples 2-1 and 2-2

Figure 21:
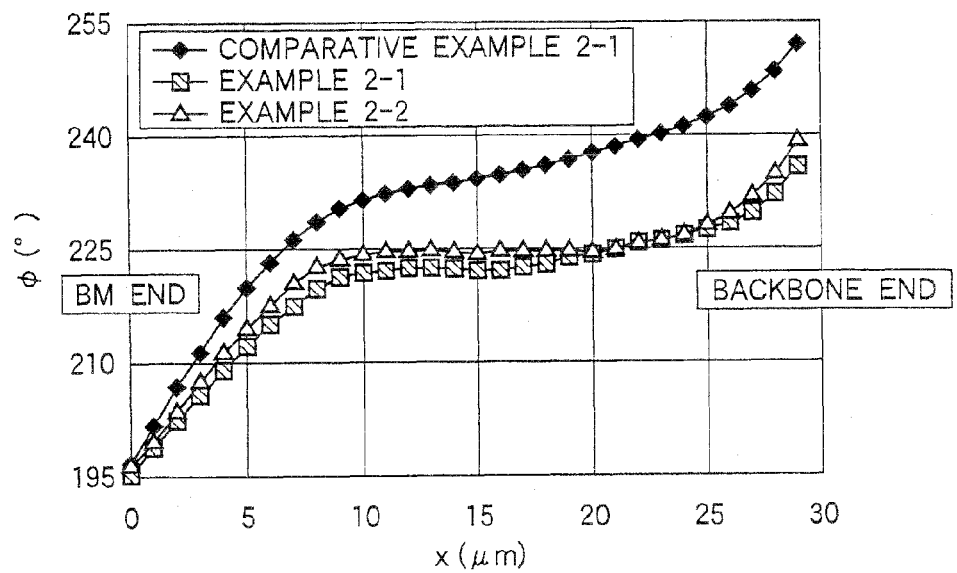
FIG. 21 is a graph illustrating the azimuth angle distribution of the alignment of liquid crystals of the liquid crystal display device.

FIG. 21 is a graph illustrating the azimuth angle distributions of the alignment of liquid crystals of the liquid crystal display devices of the examples 2-1 and 2-2 and the comparative example 2-1. The azimuth angle distribution is that the average value at the azimuth angle is determined by computation when an area is scanned in the horizontal (x) direction from the BM end to the backbone end, the area surrounded by a thick line in FIGS. 16, 18 and 20 in which the micro slits 30a and 30b are extended in the azimuth angle of 225 degrees. It shows that when the average value of the azimuth angle is greatly shifted from the angle of 225 degrees, the φ fluctuations of the alignment of liquid crystals are greater.

As shown in FIG. 21, in the comparative example 2-1, since great φ fluctuations are generated in the border area between the direct coupling part 16a and the capacitive coupling part 16b, the average value of the azimuth angle is also greatly shifted from the azimuth angle of 225 degrees controlled by the micro slits 30a and 30b. On the other hand, in the examples 2-1 and 2-2, those fluctuations are removed, and thus the shift is made small. In addition, in the example 2-2, light is shielded in the area in which the φ fluctuations are relatively great by the BM 50, and thus the shift is smaller than that in the example 2-1.

Figure 22:
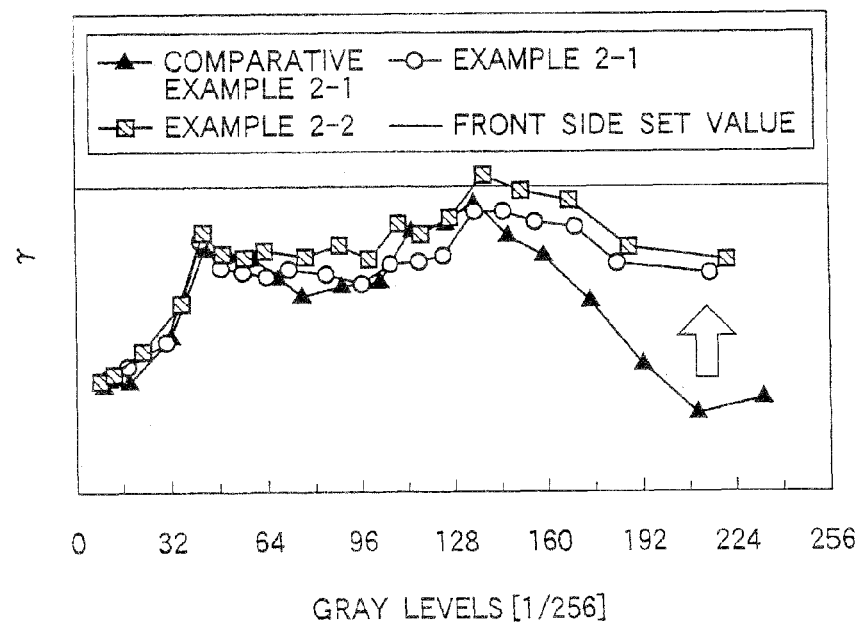
FIG. 22 is a graph illustrating the gray level γ characteristic of the liquid crystal display device in the oblique direction.

FIG. 22 shows a graph illustrating the gray level γ characteristic in the oblique direction in the liquid crystal display devices of the examples 2-1 and 2-2 and the comparative example 2-1. The gray level γ characteristic is determined by actually measuring the γ value at every gray level at the position in the horizontal direction and tilted at an angle of 60 degrees from the substrate normal for the entire pixel area. It shows that when the γ value is greatly shifted from a set value on the front side, the color shift becomes greater in that direction.

As shown in FIG. 22, in the comparative example 2-1, great φ fluctuations are generated in the border area between the direct coupling part 16a and the capacitive coupling part 16b, and thus the γ value is greatly shifted from a set value on the front side particularly on the high gray level side. On the other hand, in the examples 2-1 and 2-2, those φ fluctuations are removed, and thus the shift is made small. In addition, in the example 2-2, light is shielded in the area in which the φ fluctuations are relatively great by the BM 50, and thus the shift is made smaller than that in the example 2-1.

Example 2-3

Figure 23:
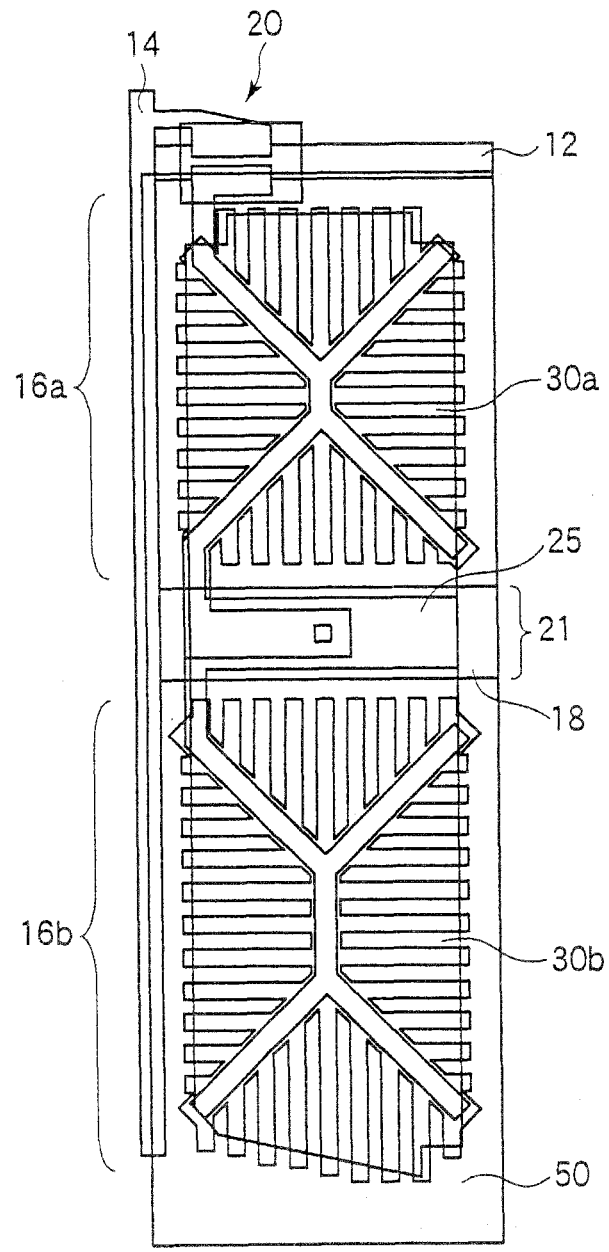
FIG. 23 is a diagram illustrating the pixel configuration of a liquid crystal display device according to the example 2-3 of the second embodiment of the invention.
Figure 24:
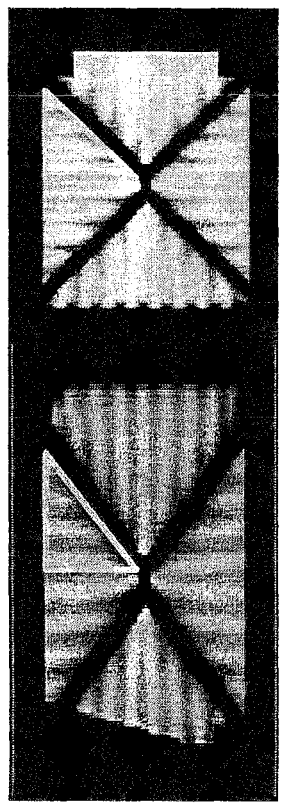
FIG. 24 is a diagram illustrating the pixel alignment of the liquid crystal display device according to the example 2-3 of the second embodiment of the invention.

FIG. 23 shows the pixel configuration of a liquid crystal display device according to example 2-3 of the embodiment, and FIG. 24 shows the pixel alignment of the liquid crystal display device according to the example. As shown in FIG. 23, in the example, a direct coupling part 16a and a capacitive coupling part 16b are isolated from each other at the border of a storage capacitor part 21, and the direction in which micro slits 30a and 30b are extended adjacent to a gate bus line 12 or a drain bus line 14 is almost vertical to the direction in which the gate bus line 12 or the drain bus line 14 is extended. The example has almost the same configuration as that of the example 2-1 except the direction in which the micro slits 30a and 30b are extended and the shape of a control capacitance electrode 25. However in the example, the direction in which the micro slits 30a and 30b are extended is almost vertical to the direction in which the gate bus line 12 or the drain bus line 14 is extended and the shape of the backbone part is also changed in accordance therewith, and thus the shape of the control capacitance electrode 25 is correspondingly modified.

In the comparative example 2-1, and the examples 2-1 and 2-2, since the direction in which the micro slits 30a and 30b are extended is tilted at an angle of 45 degrees with respect to the gate bus line 12 or the drain bus line 14, the direction of the oblique electric field of the pixel electrode is shifted from the direction of the oblique electric field of the pixel space at an angle of 45 degrees. On the other hand, in the example 2-3, since the direction in which the micro slits 30a and 30b are extended is almost vertical to the direction in which the gate bus line 12 or the drain bus line 14 is extended, the direction of the oblique electric field of the pixel electrode and the direction of the oblique electric field of the pixel space are almost the same direction, and the alignment orientation of the liquid crystals 6 near the gate bus line 12 or the drain bus line 14 can be aligned with the orientation controlled by the micro slits 30a and 30b. Here, the reason why the direction in which the micro slits 30a and 30b are extended is almost vertical to the direction in which the gate bus line 12 or the drain bus line 14 is extended is that the pixel space works as a slit of wide width to generate an oblique electric field vertical to the gate bus line 12 or the drain bus line 14.

In addition, when the pixel alignments of the comparative example 2-1, and the examples 2-1 and 2-2 are compared with the pixel alignment of the example shown in FIG. 24, in the example, the dark line near the gate bus line 12 or the drain bus line 14 is obviously small, and it is revealed that no problem arises even though light is not shielded in a part of the pixel electrode near the storage capacitor part 21 by the BM 50.

Pixel Evaluation in Example 2-3

Figure 25:
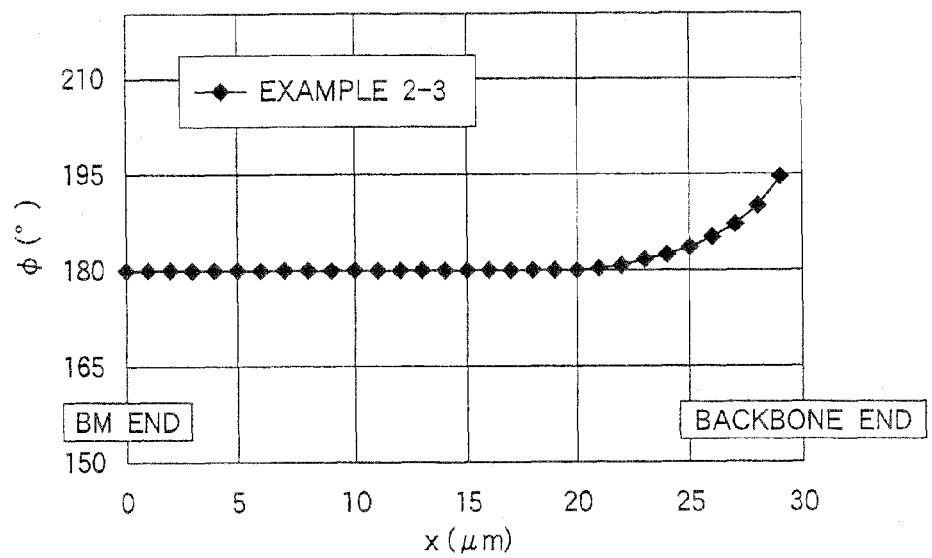
FIG. 25 is a graph illustrating the azimuth angle distribution of the alignment of liquid crystals of a liquid crystal display device.

FIG. 25 shows a graph illustrating the azimuth angle distribution of the alignment of liquid crystals of the liquid crystal display device according to the example 2-3. The azimuth angle distribution is that the average value at the azimuth angle is determined by computation when an area is scanned in the horizontal (x) direction, the area surrounded by a thick line in FIG. 24 in which the micro slits 30a and 30b are extended in the azimuth angle of 180 degrees. It shows that when the average value of the azimuth angle is greatly shifted from the angle of 180 degrees, the $\phi$ fluctuations of the alignment of liquid crystals are greater.

As shown in FIG. 25, in the example 2-3, the $\phi$ fluctuations almost the same as those in the examples 2-1 and 2-2 are generated near the backbone part, but the $\phi$ fluctuations are removed at the BM end at which the greatest $\phi$ fluctuations are generated in the comparative example 2-1, and the examples 2-1 and 2-2.

Figure 26:
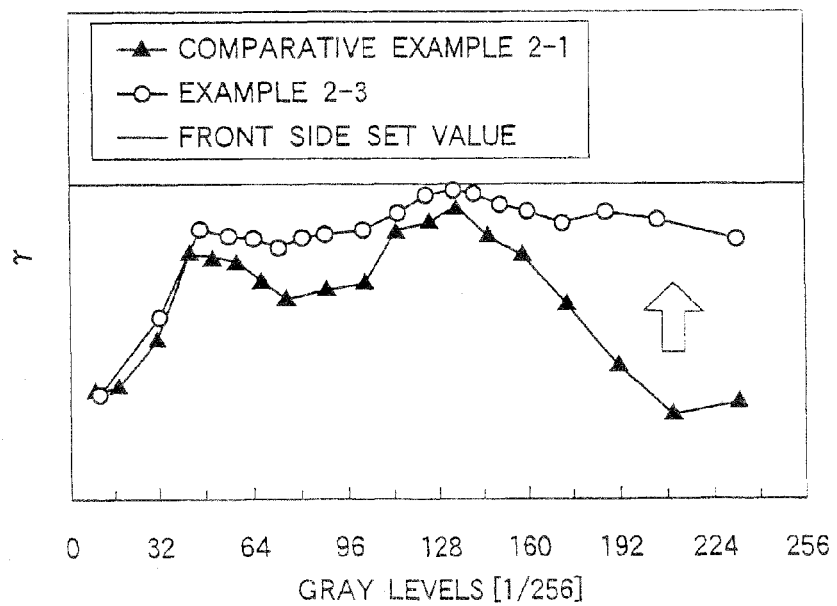
FIG. 26 is a graph illustrating the gray level γ characteristic of the liquid crystal display device in the oblique direction.

FIG. 26 shows a graph illustrating the gray level γ characteristic of the liquid crystal display devices in the oblique direction according to the comparative example 2-1 and the example 2-3. The gray level γ characteristic is determined by actually measuring the γ value at every gray level at the position in the horizontal direction and tilted at an angle of 60 degrees from the substrate normal for the entire pixel area. It shows that when the γ value is greatly shifted from a set value on the front side, the color shift becomes greater in that direction.

As shown in FIG. 26, in the comparative example 2-1, great $\phi$ fluctuations are generated in the border area between the direct coupling part 16a and the capacitive coupling part 16b, and thus the γ value is greatly shifted from a set value on the front side particularly on the high gray level side. On the other hand, in the example 2-3, those $\phi$ fluctuations are removed, and thus the shift is made small. In addition, as compared with the examples 2-1 and 2-2, the example 2-3 has the smallest shift of the γ value in the entire gray levels.

Third Embodiment

Figure 27:
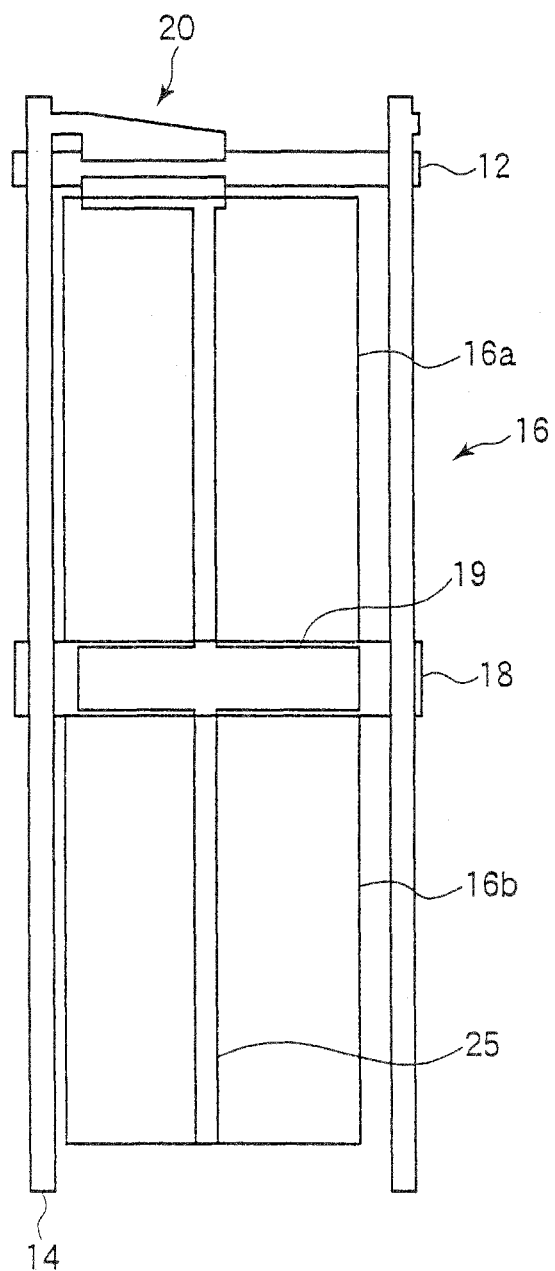
FIG. 27 is a diagram illustrating the pixel configuration of a liquid crystal display device.

Next, a liquid crystal display device according to a third embodiment of the invention will be described with reference to FIGS. 27 to 33. FIG. 27 shows the pixel configuration of a liquid crystal display device which can vary the voltage applied to the liquid crystals in a single pixel. As shown in FIG. 27, a pixel electrode 16 has a direct coupling part 16a which is directly connected to a source electrode of a TFT 20, and a capacitive coupling part 16b which is connected to the source electrode through capacitance. For example, a micro slit is formed both in the direct coupling part 16a and the capacitive coupling part 16b, and monomers are polymerized with voltage applied to liquid crystals. Thus, a liquid crystal display device of an excellent display characteristic can be obtained.

FIGS. 28A to 28C schematically show process steps of polymerizing monomers mixed in liquid crystals. In polymerizing monomers 61 shown in FIG. 28A, voltage is applied to the liquid crystals to tilt liquid crystals molecules 60 and the monomer 61 in a predetermined direction for irradiating UV light (FIG. 28B). The monomers 61 are polymerized by the UV light, and polymer main chains 62 are formed on the interface of a substrate 63 (FIG. 28C). Thus, the tilt orientation of the liquid crystals molecules 60 is stored.

However, in the area on the control capacitance electrode 25, sufficient UV light cannot be irradiated onto the liquid crystals. Therefore, since monomer polymerization is insufficient and the alignment control is weaker than that in the other areas, a problem arises that the alignment of the liquid crystals is unstable and the response speed is slow (the response time is prolonged).

The embodiment is made to solve the problem, and an object is to provide a liquid crystal display device which has an excellent response of liquid crystals and bright display.

The object is achieved by a liquid crystal display device including: sandwiching liquid crystals containing polymerizable monomers between a first substrate provided with a pixel electrode having a micro slit and a second substrate facing the first substrate; polymerizing the monomers as voltage is applied to the liquid crystals; and controlling an alignment orientation of the liquid crystals to a direction in which the micro slit is extended, wherein the pixel electrode includes: a direct coupling part which is electrically connected to a switching element; and a capacitive coupling part which is electrically insulated from the switching element, and which forms capacitance with a control capacitance electrode which has a same potential as that of a source electrode of the switching element, wherein the capacitive coupling part has an electrode open part which is disposed in a border between split areas of the alignment of liquid crystals, and the control capacitance electrode is disposed below the electrode open part.

In the liquid crystal display device according to the embodiment, the electrode open part has a width equal to or greater than one fourth of a cell thickness.

In the liquid crystal display device according to the embodiment, the electrode open part has a cross shape.

In the liquid crystal display device according to the embodiment, a side of the electrode open part facing the micro slit is almost vertical to a direction in which the micro slit is extended.

FIG. 29 shows a diagram illustrating the basic pixel configuration of a liquid crystal display device according to the embodiment. As shown in FIG. 29, a pixel electrode 16 has a direct coupling part 16a which is electrically connected to a source electrode of a TFT 20, and a capacitive coupling part 16b which is electrically isolated from the direct coupling part 16a and forms capacitance with a control capacitance electrode 25 which is the same potential as that of the source electrode of the TFT 20. At the border of the liquid crystal alignment split area in the capacitive coupling part 16*b* (for example, the intersection point of alignment split lines), an electrode open part 70 is formed in which the pixel electrode 16 is partially removed. Below the electrode open part 70, the control capacitance electrode 25 is partially disposed.

A potential difference is generated between the capacitive coupling part 16*b* of the pixel electrode 16 and the control capacitance electrode 25. The electrode open part 70 having the control capacitance electrode 25 therebelow is disposed in the border between the alignment split areas, and thus the orientation of tilting the liquid crystals molecules at the pixel edge is equal to the orientation of tilting the liquid crystals molecules at the electrode open part 70 when voltage is applied. Therefore, the alignment of liquid crystals in the border between the alignment split areas quickly becomes stable. However, when the electrode open part is disposed at the position at which the control capacitance electrode 25 is not disposed in the lower layer, the orientation of tilting the liquid crystals molecules at the electrode open part is reverse to the orientation of tilting the liquid crystals molecules at the pixel edge. Thus, the alignment in the border between the alignment split areas becomes unstable.

Hereinafter, the liquid crystal display device according to the embodiment will be described more specifically with examples.

Example 3-1

A TFT substrate having the pixel configuration shown in FIG. 29 was prepared. The TFT substrate and a opposite substrate were bonded together to have a cell thickness of 4.25 µm, negative liquid crystals A produced by Merck Ltd., which had polymerization monomers dissolved were sealed between the substrates, and a liquid crystal display panel was prepared which was 15 inches diagonally. The liquid crystal display panel prepared was annealed at a temperature of 90° C. for 30 minutes. After cooled, 5000 mJ of no polarized ultraviolet rays including wavelengths of 300 to 400 nm were irradiated while 20 V of AC voltage was applied to the liquid crystals. As the result of observing the alignment of liquid crystals, it was confirmed that the alignment in a single pixel was split into four parts.

Figure 30B:
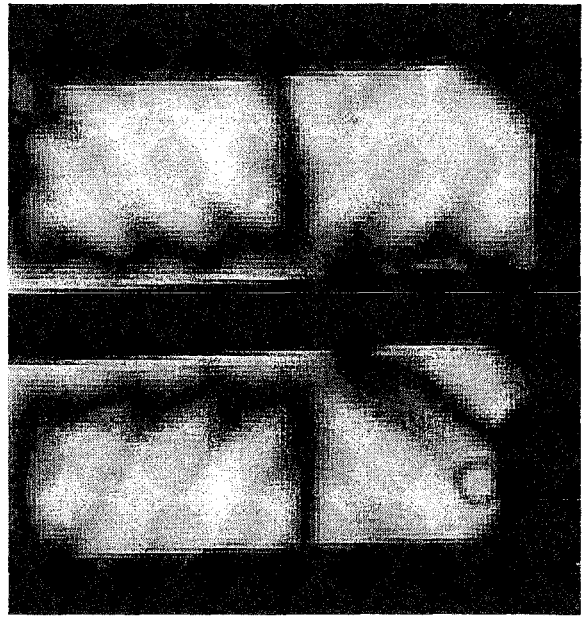
FIGS. 30A and 30B are diagrams illustrating the alignment state near the alignment split area of a liquid crystal display panel according to example 3-1 of the third embodiment of the invention.
Figure 30A:
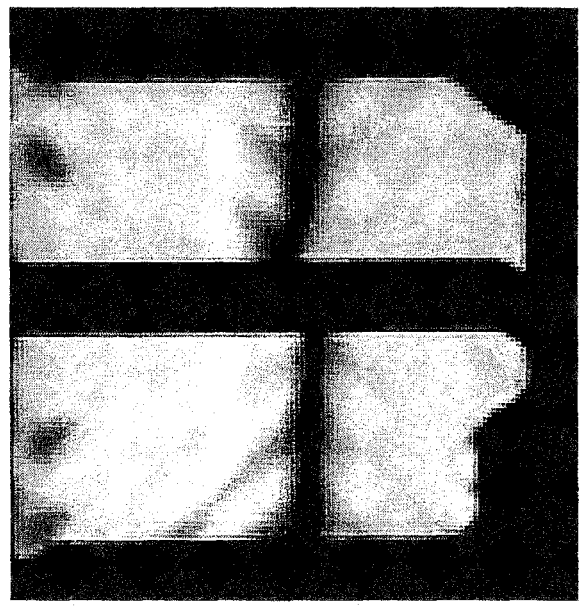

FIG. 30A shows the alignment state near the alignment split area of the pixel of a liquid crystal display panel according to the embodiment. FIG. 30B shows the alignment state of a liquid crystal display panel according to a comparative example in which no electrode open part 70 is disposed. As shown in FIGS. 30A and 30B, in the liquid crystal display device according to the embodiment, the electrode open part 70 was disposed to obtain a stable alignment of liquid crystals.

The relationship between the presence of the electrode open part 70 and the response speed (response time) was studied. In the liquid crystal display panel according to the example in which the electrode open part 70 was disposed, the response time was shorter than that of the liquid crystal display panel having no electrode open part 70. Here, the response time is defined by the sum of the rise time (τr) of 10 to 90% of the transmittance intensity of write (white) voltage and the fall time (τr) of 90 to 10% of that.

Example 3-2

Figure 31:
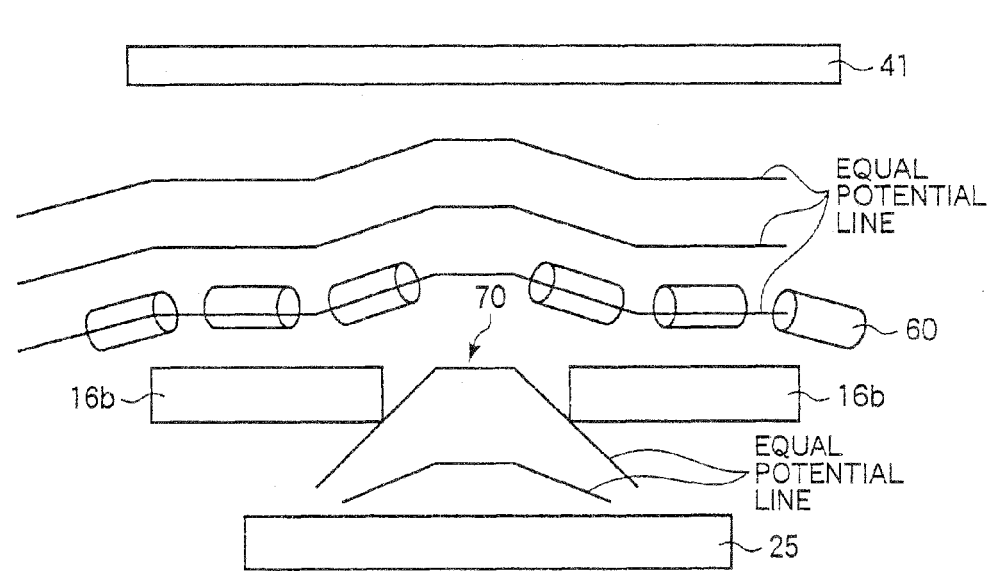
FIG. 31 is a diagram illustrating the relationship between an electrode open part and an equal potential line.

In a liquid crystal display panels prepared by almost the same process steps as those of the example 3-1, the relationship between the width of the electrode open part 70 and the response time was studied. FIG. 31 shows the relationship between the electrode open part 70 and the equal potential line. As shown in FIG. 31, when the width of the electrode open part 70 equals or is greater than one fourth of a cell thickness, the orientation of tilting the liquid crystals molecules 60 at the pixel edge is equal to the orientation of tilting the liquid crystals molecules 60 at the electrode open part 70. On the other hand, when the width of the electrode open part 70 is below one fourth of a cell thickness, the orientation of tilting the liquid crystals molecules 60 at the pixel edge is in reverse to the orientation of tilting the liquid crystals molecules 60 at the electrode open part 70.

When the relationship between the width of the electrode open part 70 and the response time was studied, the response time of a liquid crystal display panel provided with an electrode open part 70 having a width smaller than one fourth of a cell thickness had almost the same response time of a liquid crystal display panel provided with no electrode open part 70. On the other hand, in a liquid crystal display panel provided with an electrode open part 70 having a width equal to or greater than one fourth of a cell thickness, the response time was more shortened than that of the liquid crystal display panel provided with no electrode open part 70.

Example 3-3

In a liquid crystal display panels prepared by almost the same process steps as those of the example 3-1, the relationship between the shape and the response time of the electrode open part 70 was studied. In the configuration shown in FIG. 32, an electrode open part 70 has a cross shape which is extended along the border between the alignment split areas. In the configuration shown in FIG. 33, an electrode open part 70 has an almost square shape, and its four sides are almost vertical to the directions in which micro slits 30*b* facing thereto are extended.

Figure 32:
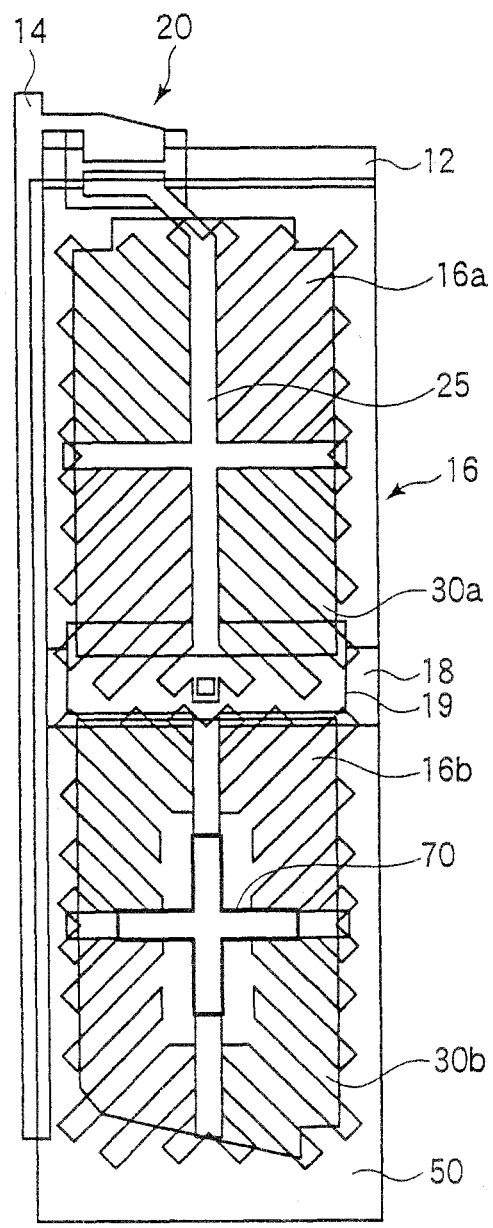
FIG. 32 is a diagram illustrating the pixel configuration of a liquid crystal display panel according to the example 3-3 of the third embodiment of the invention.
Figure 33:
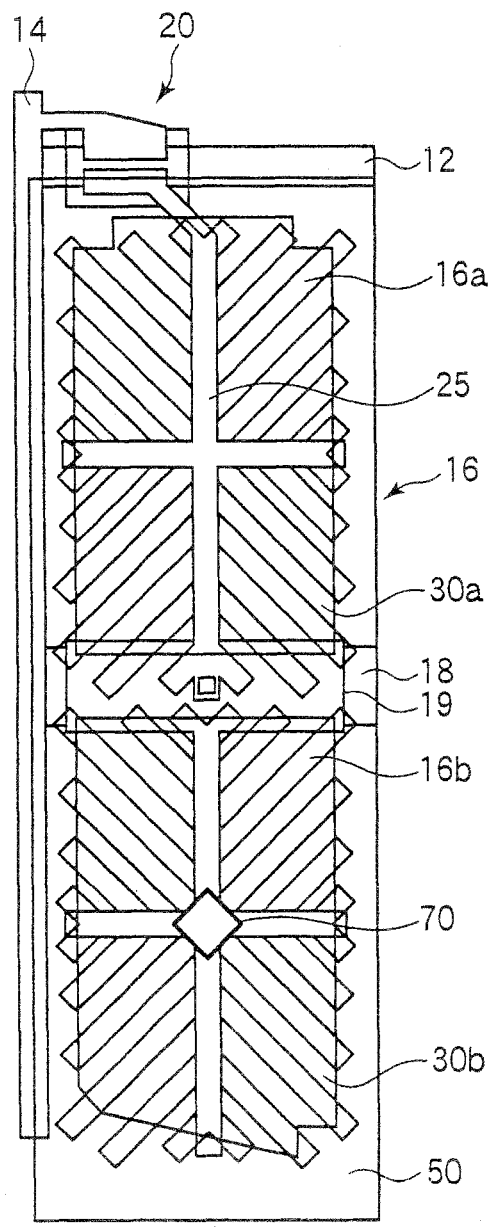
FIG. 33 is a diagram illustrating the pixel configuration of the liquid crystal display panel according to the example 3-3 of the third embodiment of the invention.
Figure 34:
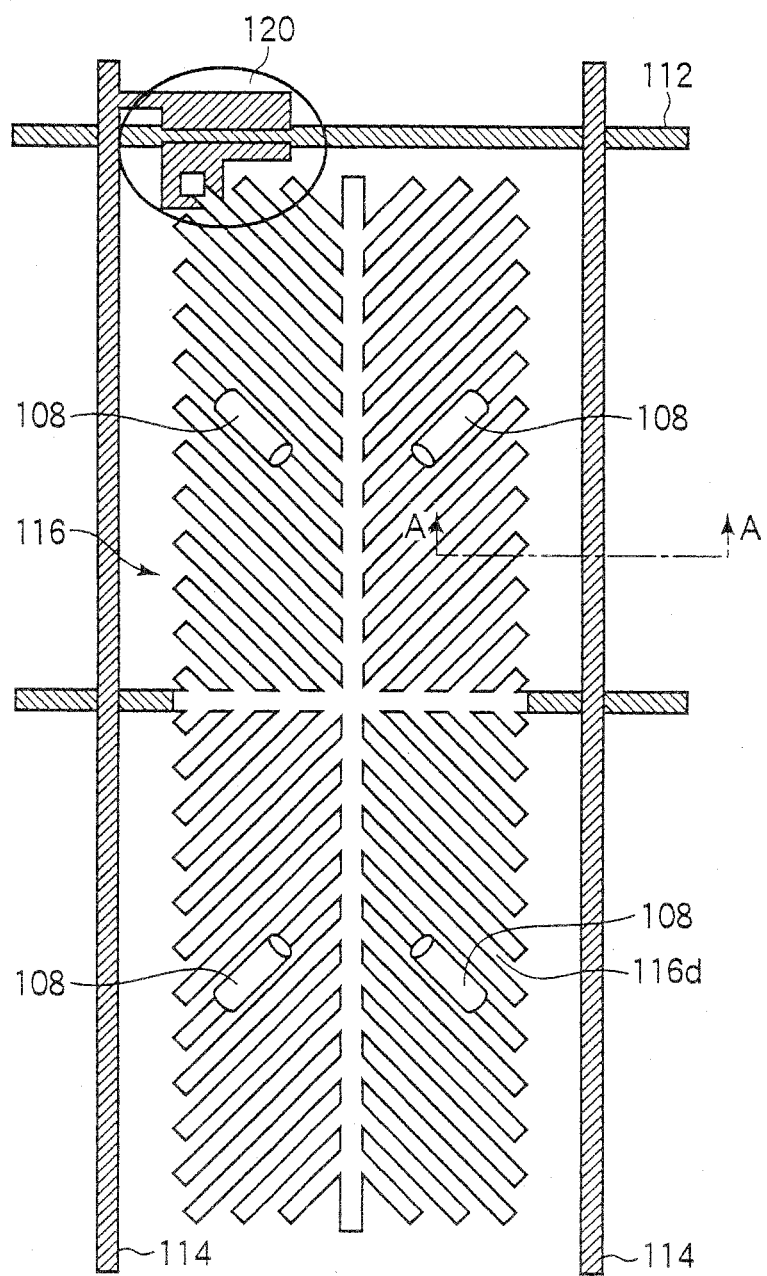
FIG. 34 is a diagram illustrating the pixel structure of a liquid crystal display device in the MVA mode.
Figure 35:
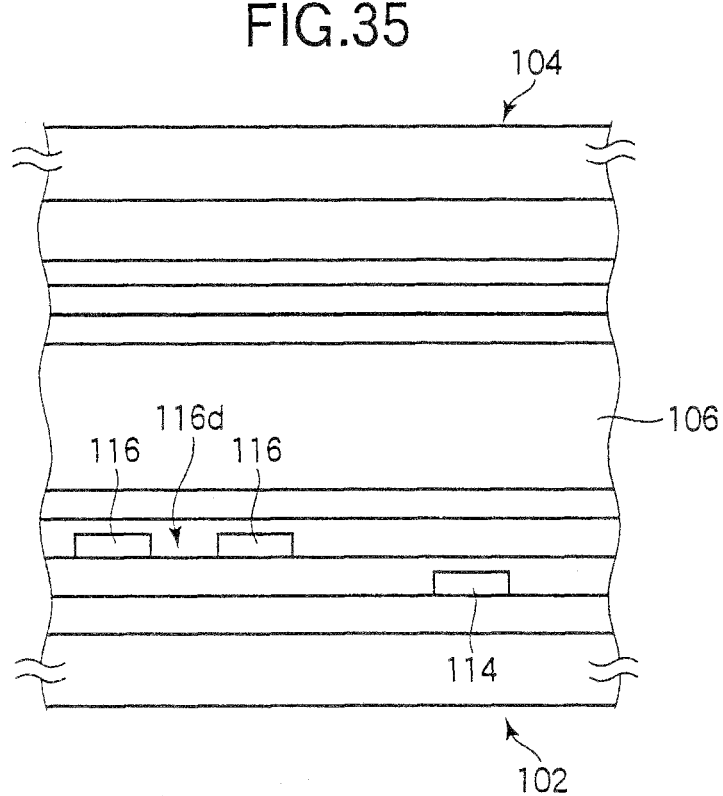
FIG. 35 is a cross section illustrating the pixel structure of the liquid crystal display device in the MVA mode.

When the relationship between the shape of the electrode open part 70 and the response time was studied, it was revealed that the electrode open parts 70 in the shapes shown in FIGS. 32 and 33 were formed to further shorten the response time than that of the liquid crystal display panel according to the example 3-1.

The invention can be modified variously, and not limited to the embodiments.

For example, the transmissive liquid crystal display device is taken as an example in the embodiments, but the invention is not limited thereto, and can be adapted to the other liquid crystal display devices such as a reflective type and a transflective type.

What is claimed is:

1. A liquid crystal display device comprising:
   a first substrate having a pixel electrode formed in each of a plurality of pixels;
   a second substrate having a common electrode and disposed opposite to the first substrate; and
   a liquid crystal layer sandwiched between the first substrate and the second substrate,
   wherein at least one of the pixels has a plurality of sub pixel regions, the pixel electrode has a first sub pixel electrode which is electrically connected to a switching element and a second sub pixel electrode which is capacitively coupled with a control capacitance electrode which has a same potential as that of a source electrode of the switching element,
   the first sub pixel electrode and the second sub pixel electrode have a plurality of spaces and elongated portions being alternately arranged and extend in four directions different from each other.

2. The liquid crystal display device according to claim 1, wherein at least one of the pixels has two sub pixel regions.

3. The liquid crystal display device according to claim 1, wherein the elongated portions are arranged at substantially 45 degrees to an edge of the pixels.

4. The liquid crystal display device according to claim 1, wherein an extending direction of the spaces of the first sub pixel electrode and an extending direction of the spaces of the second sub pixel electrode are at a substantially right angle in a boundary region between the first sub pixel electrode and the second sub pixel electrode.

5. The liquid crystal display device according to claim 1, further comprising:
    a liquid crystal material included in the liquid crystal layer and having negative dielectric anisotropy.

6. The liquid crystal display device according to claim 1, further comprising:
    an alignment film formed in each of the first substrate and the second substrate; and
    a polymerized film formed on an interface of the alignment film.

7. The liquid crystal display device according to claim 6, wherein a tilt orientation of a liquid crystal molecule included in the liquid crystal layer is controlled by the polymerized film,
    the polymerized film is formed by polymerizing a polymerizable component mixed in the liquid crystal layer with voltage applied in the liquid crystal layer.

8. The liquid crystal display device according to claim 7, wherein the polymerized film is formed by irradiating an ultraviolet ray to the polymerizable component.

\* \* \* \* \*